(12) United States Patent  
Reiker

(10) Patent No.: US 6,303,862 B1  
(45) Date of Patent: Oct. 16, 2001

(54) ELECTRICAL BOX WITH MAIN CAVITY AND SEPARATE AUXILIARY CAVITY AND HAVING OPTIONAL DIMPLED HOLE AND STRENGTHENING ELEMENT

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/372,100

(22) Filed: Aug. 11, 1999

Related U.S. Application Data

(63) Continuation-in-part of application No. 09/321,741, filed on May 28, 1999, and a continuation of application No. 09/321,741, and a continuation-in-part of application No. 08/905,142, filed on Aug. 1, 1997, said application No. 08/905,142, and a continuation-in-part of application No. 08/862,380, filed on May 23, 1997, and application No. 08/862,380, and a continuation-in-part of application No. 08/862,378, filed on May 23, 1997, now Pat. No. 5,909,006, and application No. 08/905,142, and a continuation-in-part of application No. 08/862,379, filed on May 23, 1997, said application No. 08/905,142, and a continuation-in-part of application No. 08/491,757, filed on Jun. 15, 1995, now Pat. No. 5,677,512, and application No. 08/491,757, and a continuation-in-part of application No. 08/371,695, filed on Jan. 12, 1995, now Pat. No. 5,854,443.

(60) Provisional application No. 60/018,227, filed on May 24, 1996, and provisional application No. 60/023,060, filed on Aug. 2, 1996.

(51) Int. Cl.$^7$ .................................................. H02B 1/48
(52) U.S. Cl. .............................. 174/62; 174/63; 220/3.3; 220/3.9
(58) Field of Search ................................ 174/48, 51, 53, 174/57, 58, 61, 62, 66, 63; 220/3.2, 3.3, 3.8, 3.9

(56) References Cited

U.S. PATENT DOCUMENTS

Re. 33,147   1/1990   Reiker .
Re. 34,603   5/1994   Caison et al. .
  950,176   2/1910   Hublinger .
1,004,946  10/1911   Wares .
1,040,175  10/1912   Earhart .
1,066,706   7/1913   Caine .
1,798,838   3/1931   Garvin .
1,805,027   5/1931   Adell .
1,824,708   9/1931   Davis et al. .
1,922,432   8/1933   Gould .
2,316,389   4/1943   Atkinson .
2,423,757   7/1947   Dedge .

(List continued on next page.)

FOREIGN PATENT DOCUMENTS 2 436 518   5/1980   (FR) .
1 137 442  12/1968   (GB) .
1 309 950   3/1973   (GB) .

* cited by examiner

Primary Examiner—Dean A. Reichard  
Assistant Examiner—Angel R. Estrada  
(74) Attorney, Agent, or Firm—Schlesinger, Arkwright & Garvey LLP

(57) ABSTRACT

Mounting assembly includes a junction box having a top wall and a side wall. The side wall extends downwardly away from the top wall and defines a cavity therein. An auxiliary cavity may be provided adjacent to and outside of the cavity. A support may be provided that is at least partially within the auxiliary cavity. A dimpled hole may be provided in the top wall, and the supplemental fixture support extends into the dimpled hole for engaging at least a portion of the walls thereof. A threaded hole may be provided on the supplemental fixture support. The supplemental fixture support may be a stud or rivet. A rough surface or fluting may be provided on a portion of said support for engaging the walls of the dimpled hole. Preferably, the supplemental fixture support has exposed portions which are sufficiently smooth for preventing wear to plastic-coated electrical wire which engages such exposed surfaces of the fixture support.

44 Claims, 15 Drawing Sheets

U.S. PATENT DOCUMENTS

| | | |
|---|---|---|
| 2,713,983 | 7/1955 | Kay . |
| 2,959,633 | 11/1960 | Palmer et al. . |
| 3,168,613 | 2/1965 | Palmer . |
| 3,340,349 | 9/1967 | Zerwes . |
| 3,392,228 * | 7/1968 | Zerwes .................................. 220/3.8 |
| 3,472,945 | 10/1969 | Trachtenberg . |
| 3,616,096 | 10/1971 | Roeder . |
| 3,740,451 | 6/1973 | Schindler et al. . |
| 3,770,872 | 11/1973 | Brown . |
| 4,050,603 | 9/1977 | Harris et al. . |
| 4,082,915 | 4/1978 | Silver . |
| 4,176,758 | 12/1979 | Glick . |
| 4,275,862 | 6/1981 | Takagi et al. . |
| 4,281,773 | 8/1981 | Mengeu . |
| 4,304,957 | 12/1981 | Slater et al. . |
| 4,306,109 | 12/1981 | Nattel . |
| 4,315,100 | 2/1982 | Haslbeck et al. . |
| 4,408,696 | 10/1983 | Crosson . |
| 4,424,406 | 1/1984 | Slater et al. . |
| 4,684,092 | 8/1987 | Reiker . |
| 4,880,128 | 11/1989 | Jorgensen . |
| 4,892,211 | 1/1990 | Jorgensen . |
| 4,909,405 | 3/1990 | Kerr, Jr. . |
| 4,919,292 | 4/1990 | Hsu . |
| 4,954,667 * | 9/1990 | Jorgensen et al. ...................... 174/53 |
| 4,960,964 | 10/1990 | Schnell et al. . |
| 4,983,785 * | 1/1991 | Johnston ................................. 174/53 |
| 4,988,067 | 1/1991 | Propp et al. . |
| 5,065,878 * | 11/1991 | Altmann et al. ....................... 220/3.8 |
| 5,170,014 * | 12/1992 | Borsh ..................................... 174/53 |
| 5,178,350 | 1/1993 | Vink et al. . |
| 5,234,119 | 8/1993 | Jorgensen et al. . |
| 5,303,894 | 4/1994 | Deschamps et al. . |
| 5,359,152 | 10/1994 | Hone-Lin . |
| 5,407,088 | 4/1995 | Jorgensen et al. . |
| 5,435,514 | 7/1995 | Kerr, Jr. . |
| 5,522,577 | 6/1996 | Roesch . |
| 5,677,512 | 10/1997 | Reiker . |
| 5,762,223 | 6/1998 | Kerr, Jr. . |
| 5,789,702 * | 8/1998 | Perella .................................... 174/48 |
| 5,854,443 * | 12/1998 | Reiker .................................... 174/58 |
| 5,860,548 | 1/1999 | Kerr, Jr. . |
| 5,907,124 * | 5/1999 | Reiker .................................... 174/51 |
| 5,909,006 * | 6/1999 | Reiker .................................... 174/62 |
| 5,981,874 * | 11/1999 | Reiker .................................... 174/63 |
| 6,121,549 * | 2/2000 | Korhonen ............................... 174/66 |

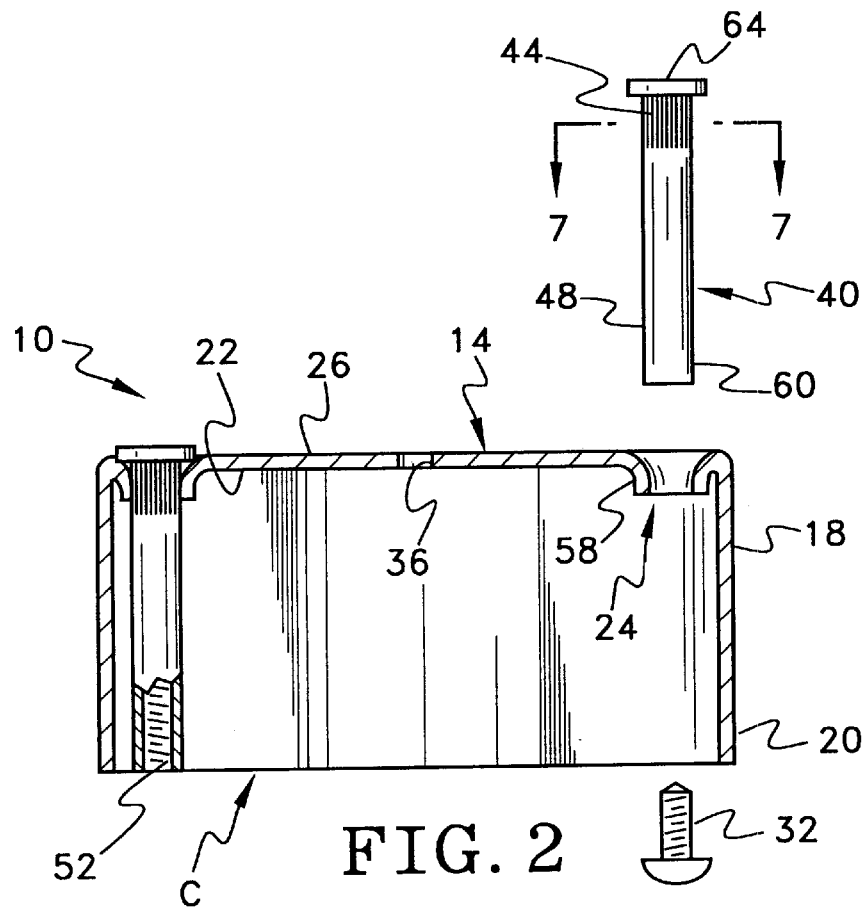
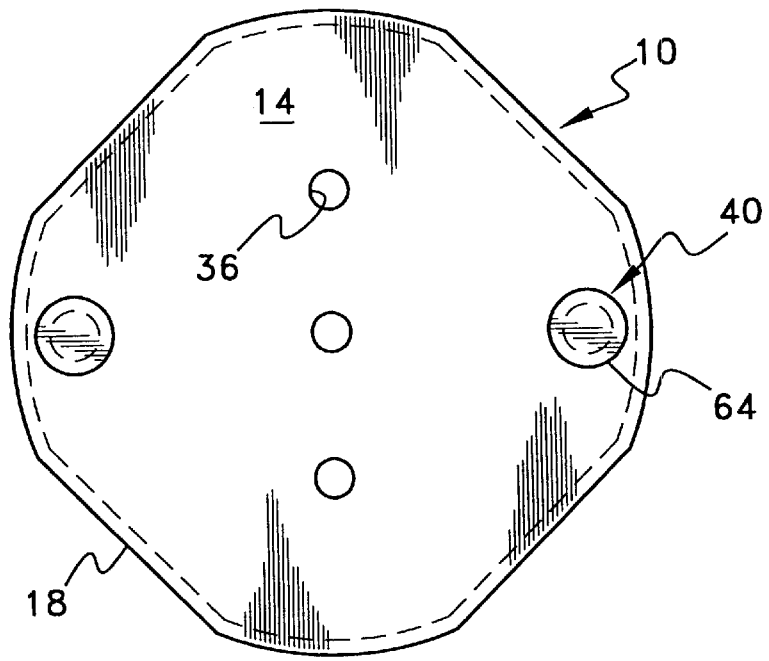

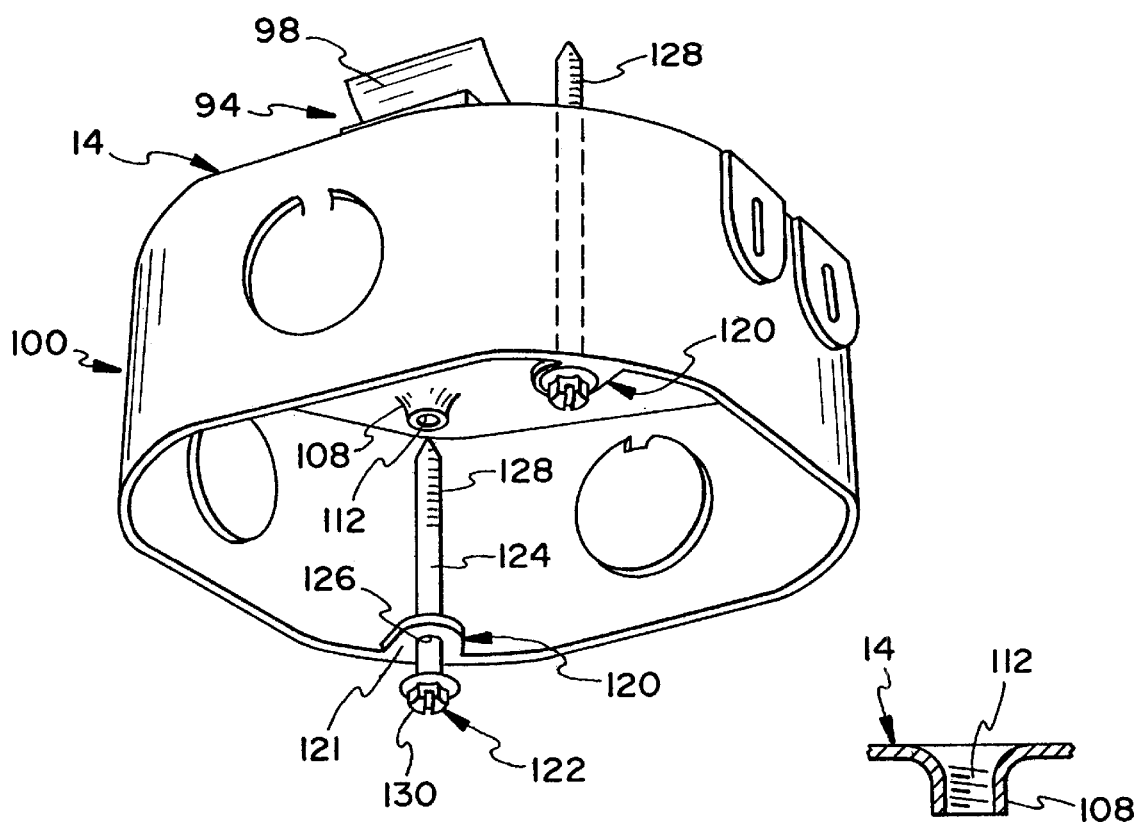
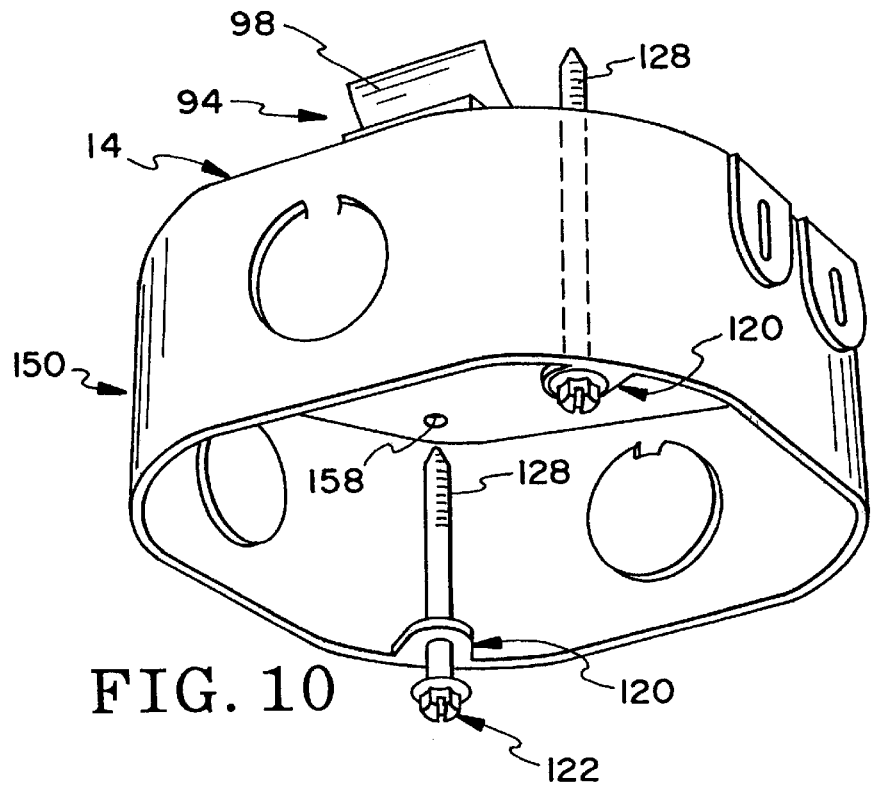
FIG. 8
FIG. 9
FIG. 10

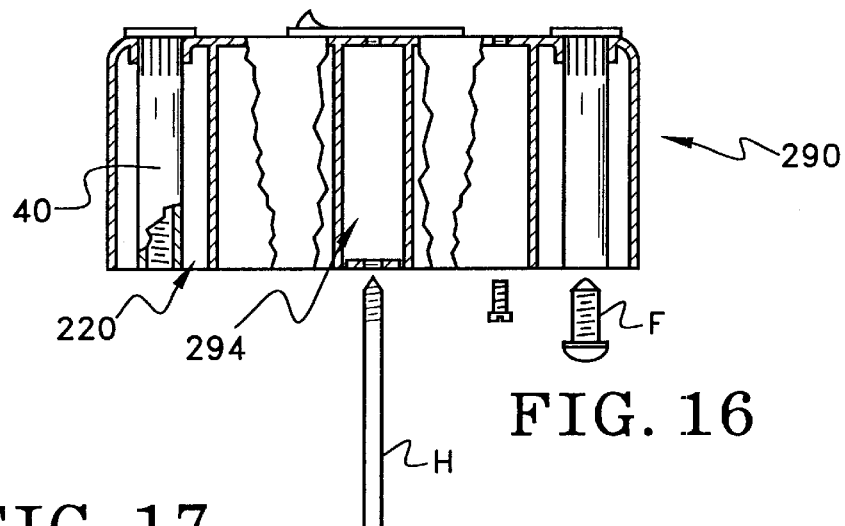
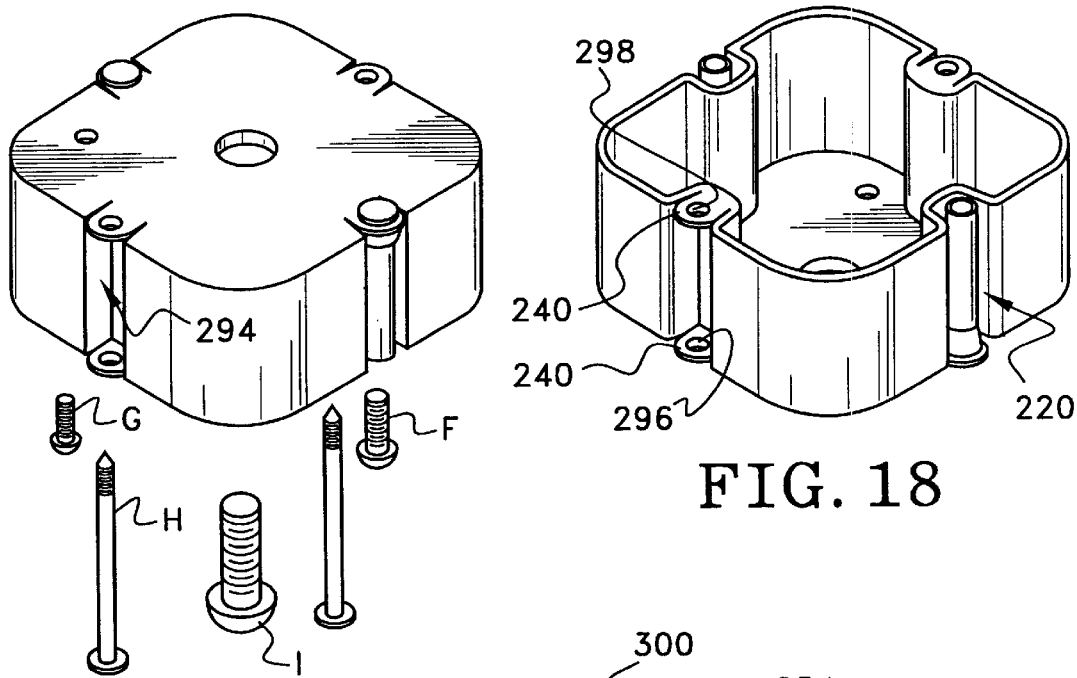
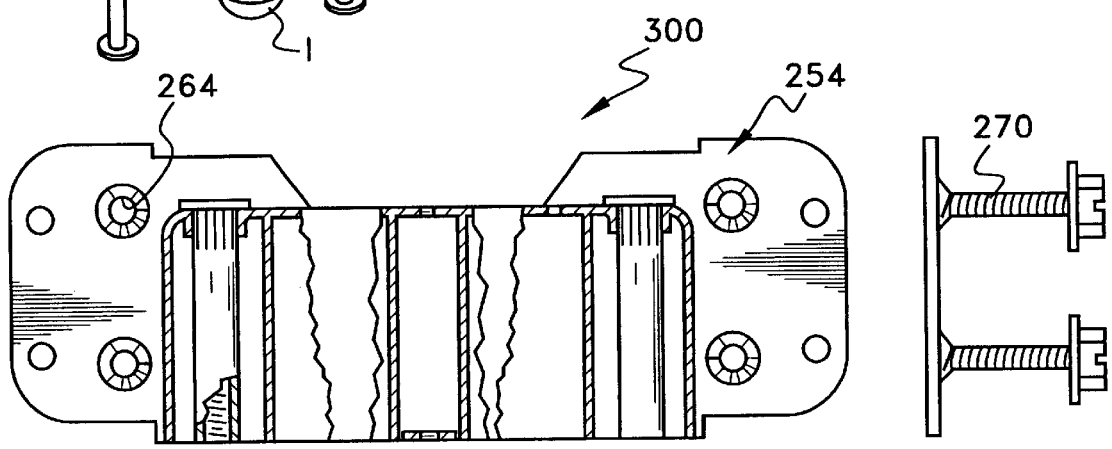

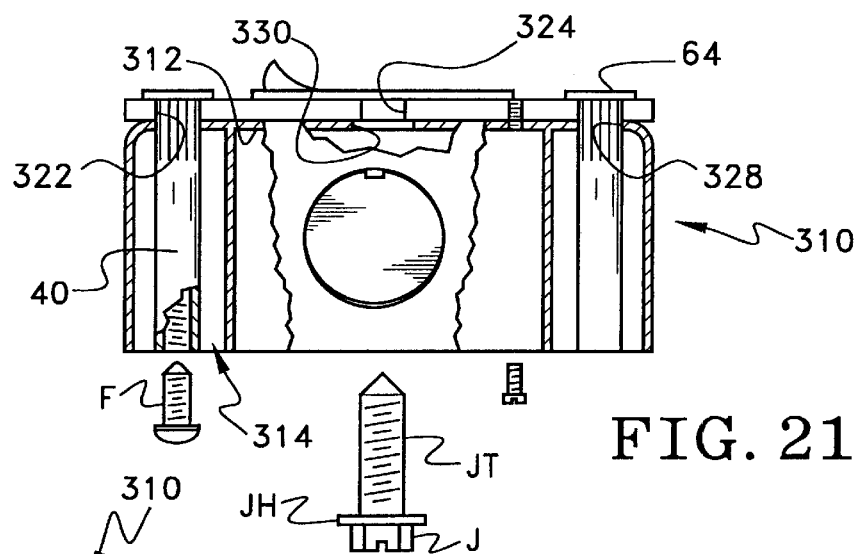
FIG. 21
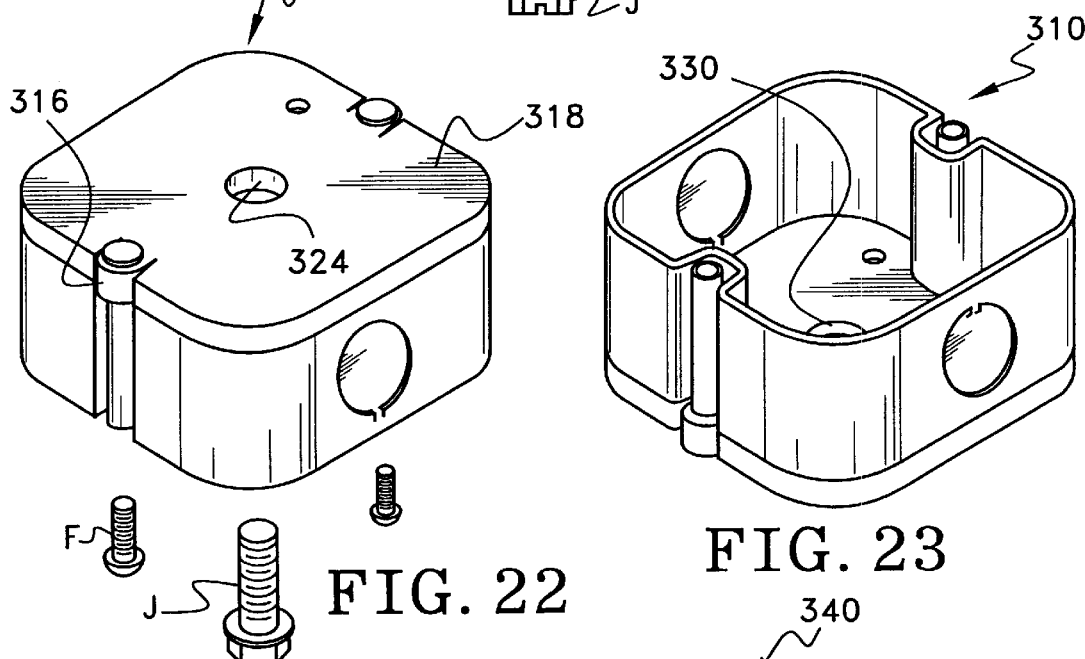
FIG. 22
FIG. 23
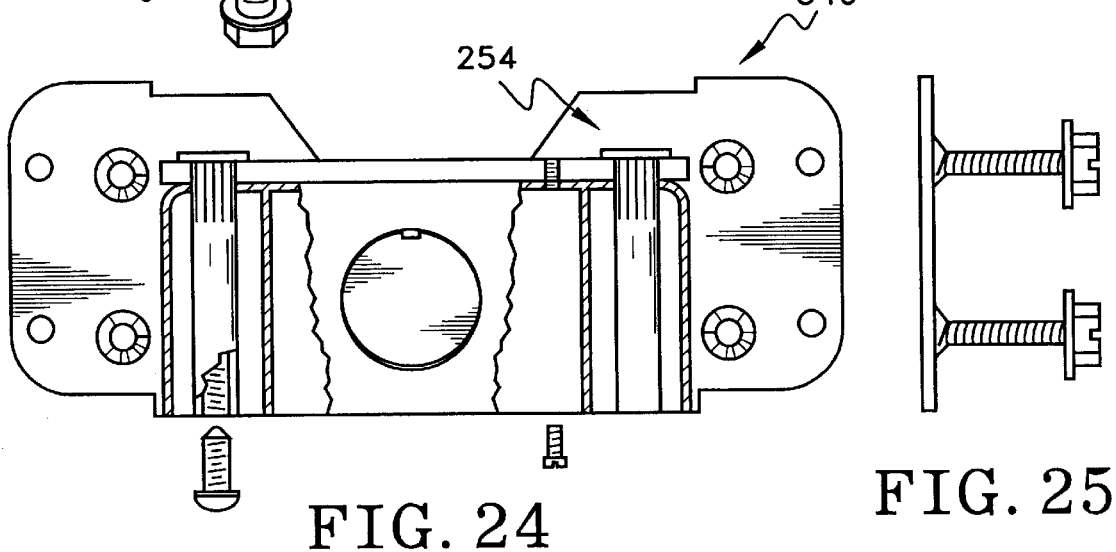
FIG. 24
FIG. 25

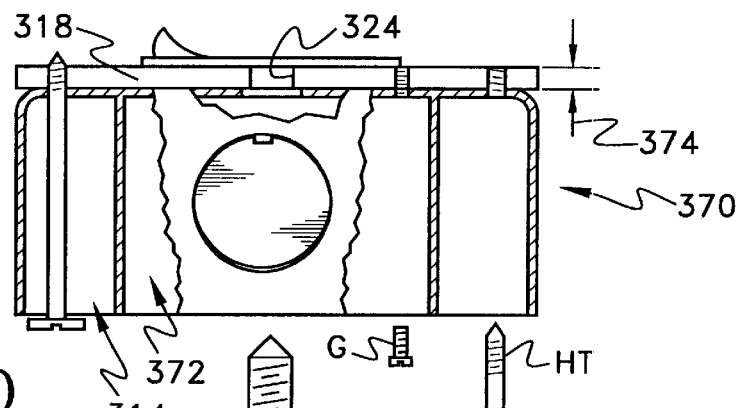
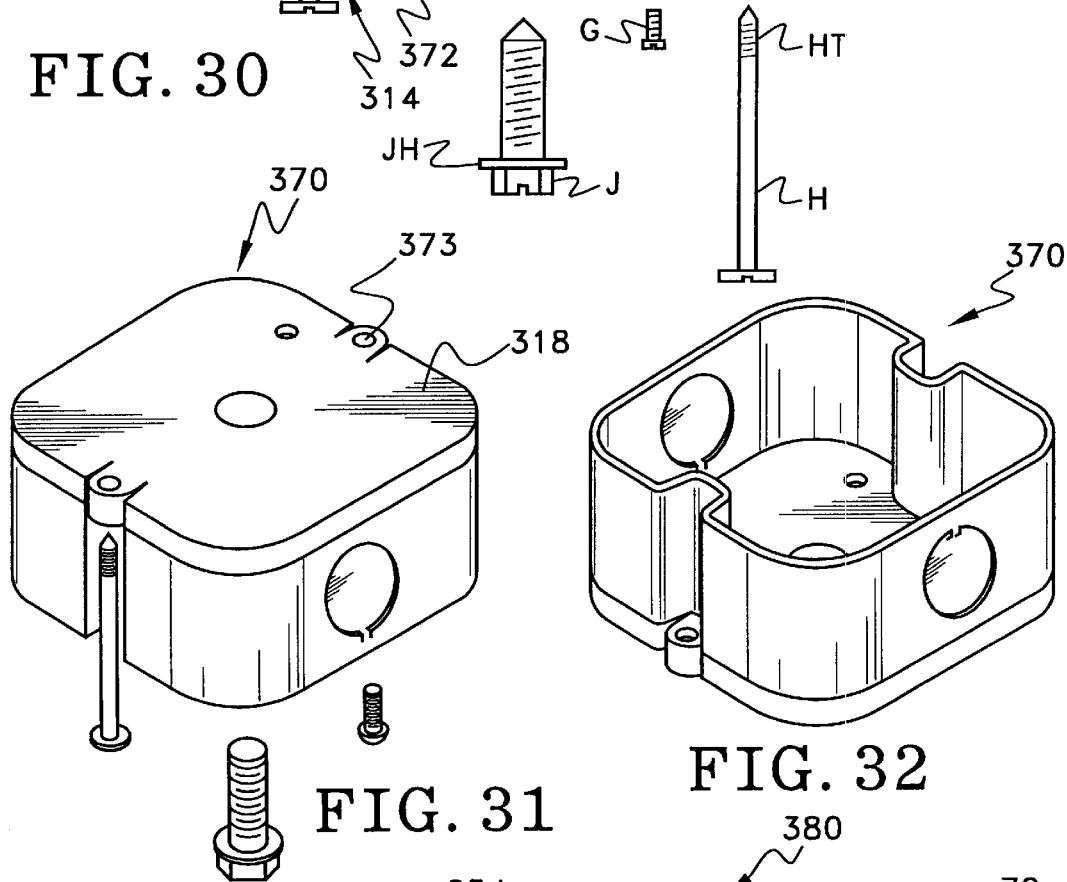
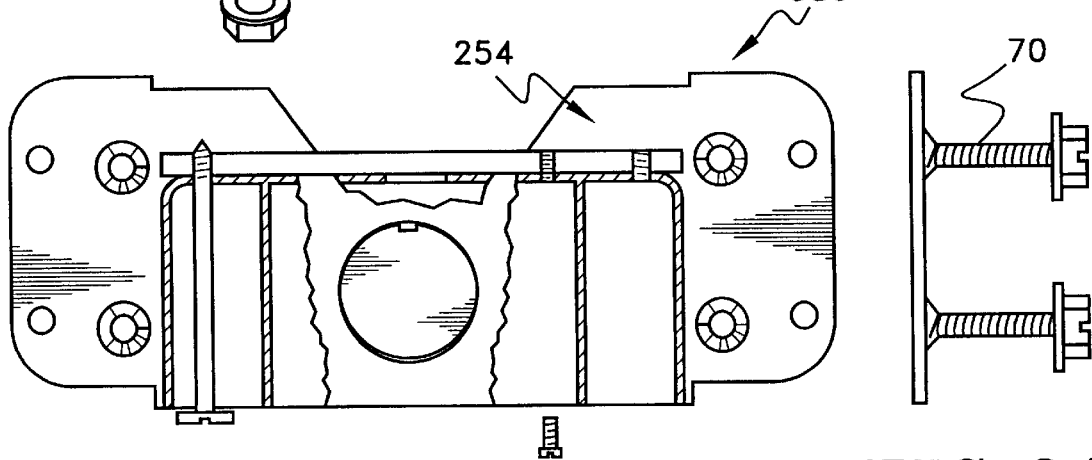

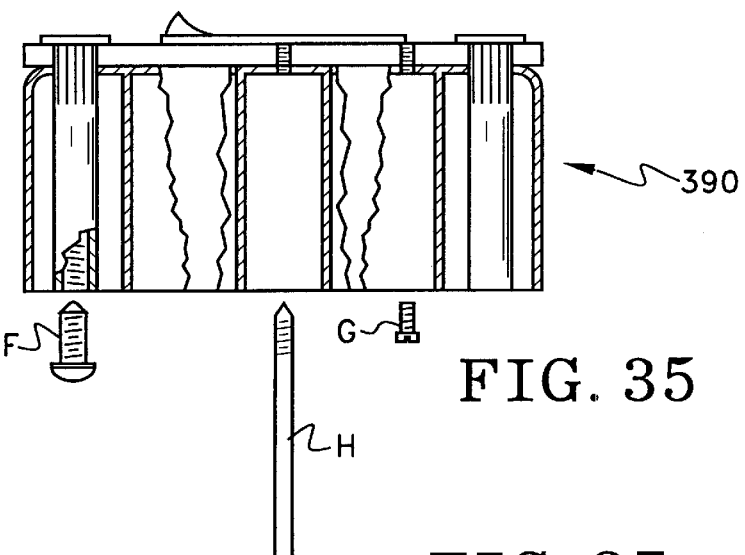
FIG. 35
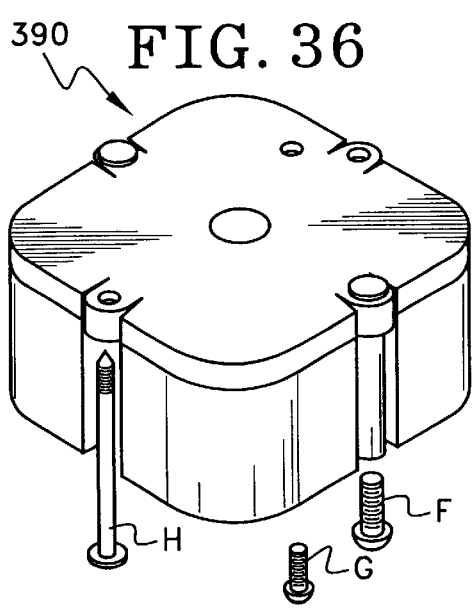
FIG. 36
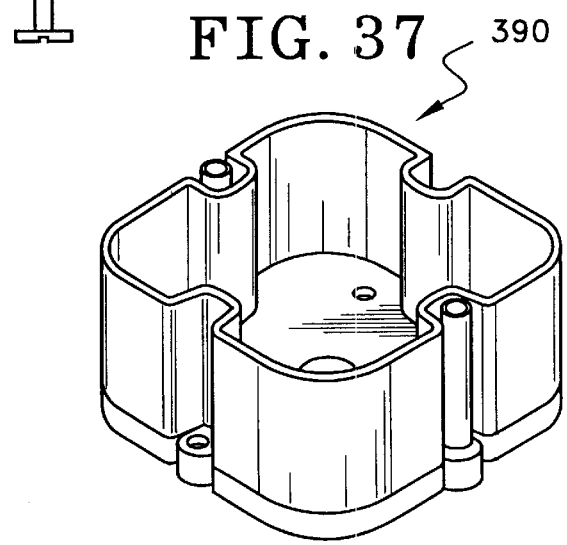
FIG. 37
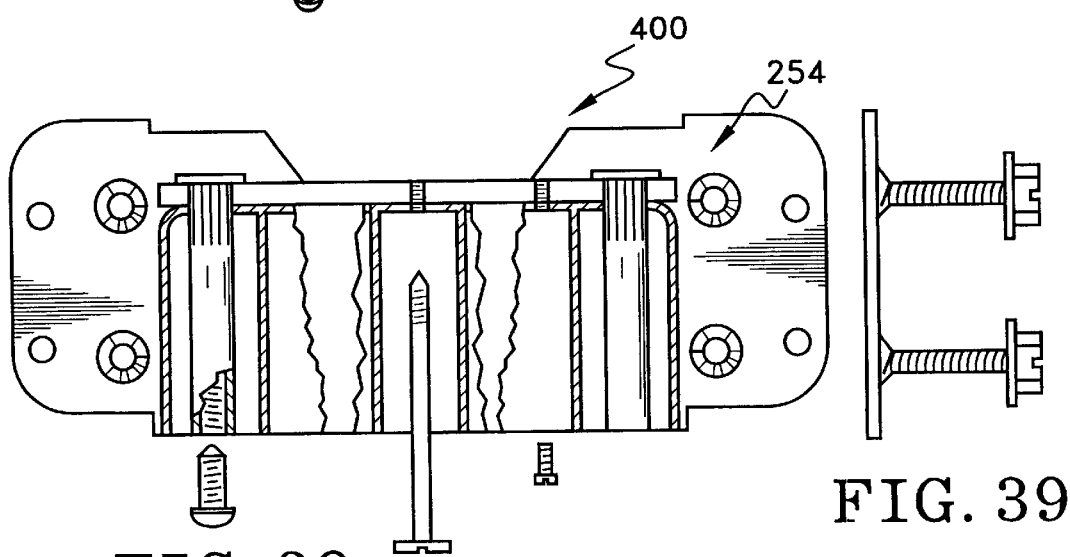
FIG. 38
FIG. 39

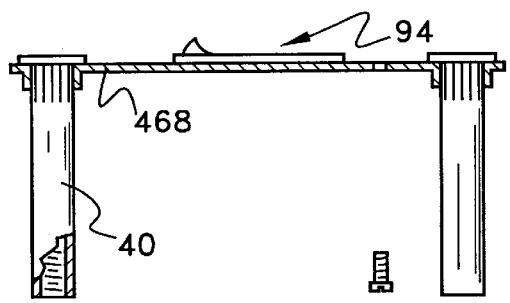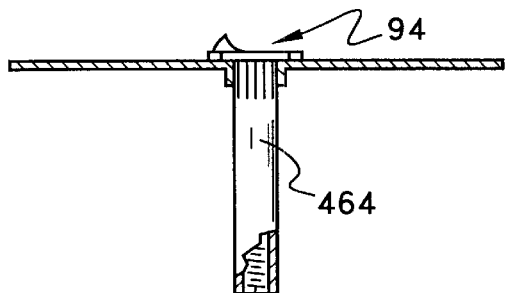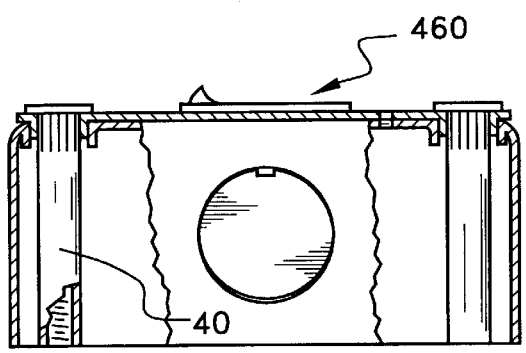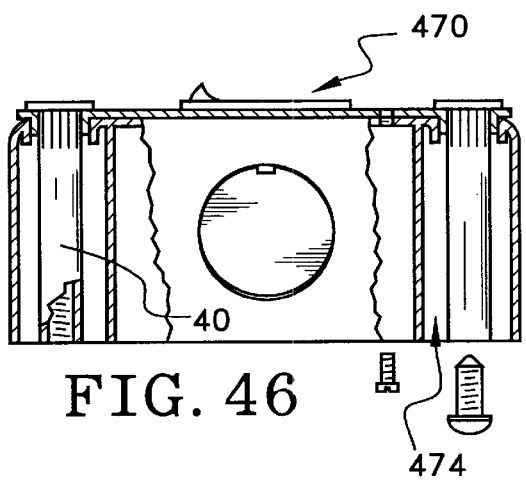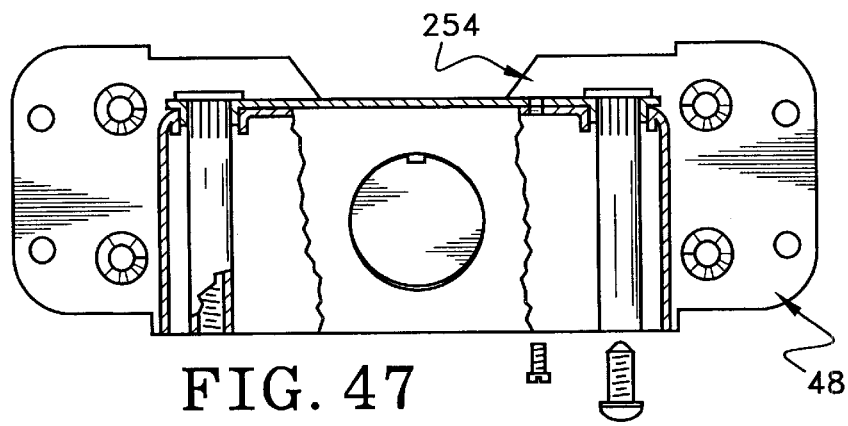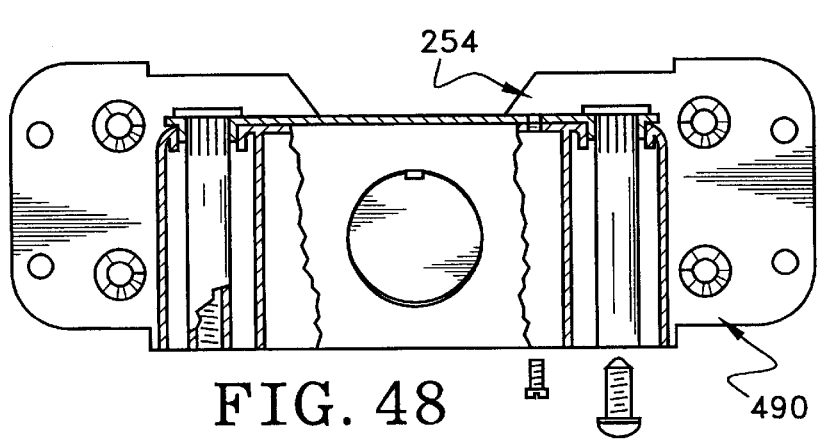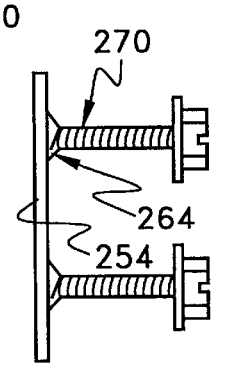

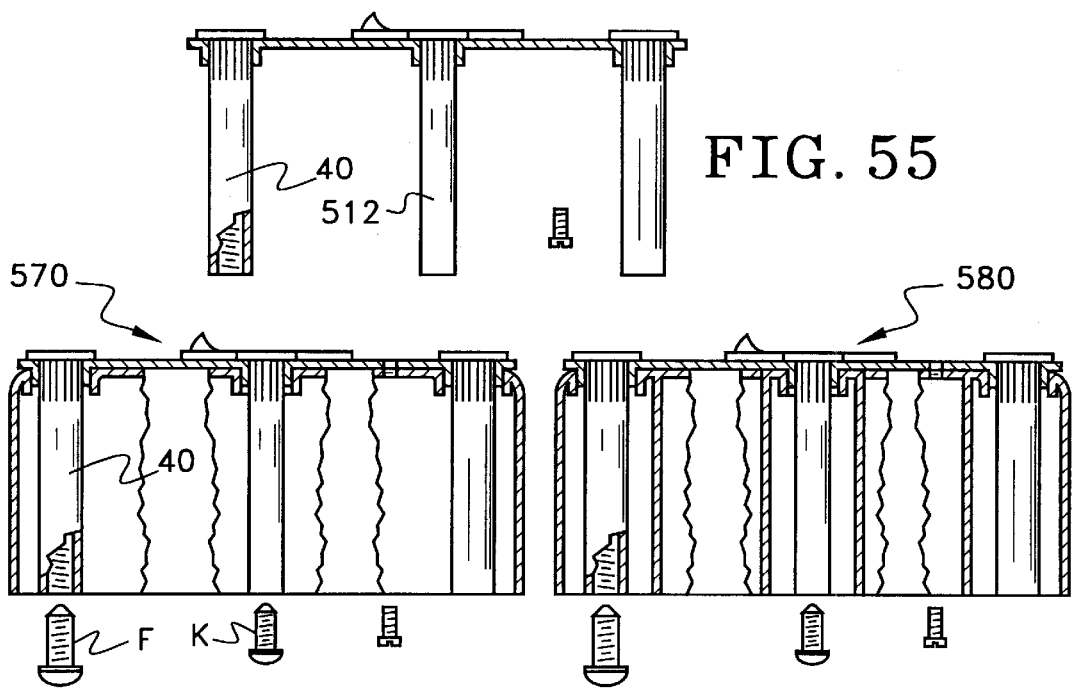
FIG. 55
FIG. 56
FIG. 57
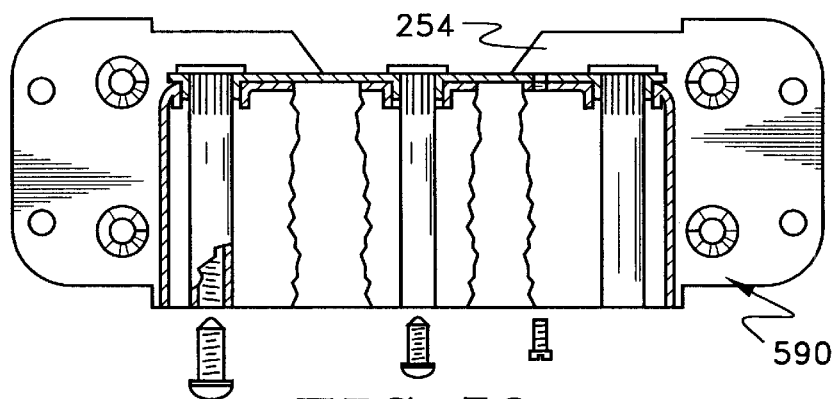
FIG. 58
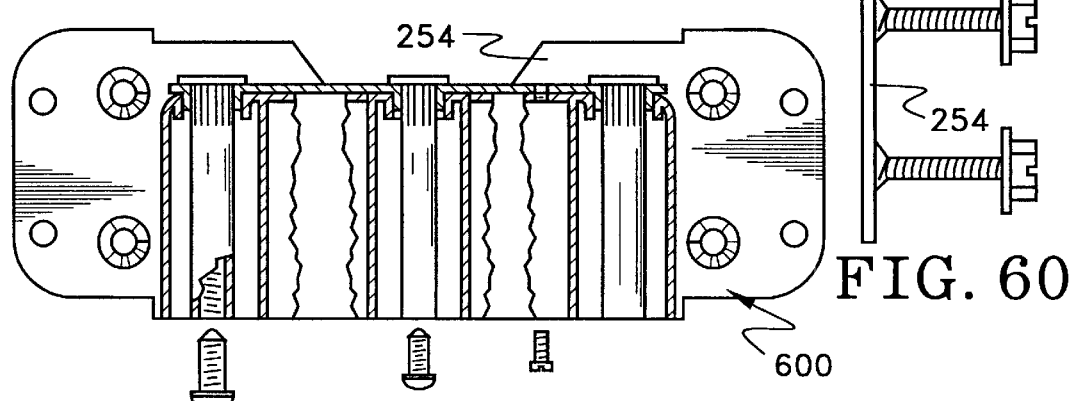
FIG. 59
FIG. 60

ELECTRICAL BOX WITH MAIN CAVITY AND SEPARATE AUXILIARY CAVITY AND HAVING OPTIONAL DIMPLED HOLE AND STRENGTHENING ELEMENT

CROSS-REFERENCE TO RELATED APPLICATIONS

This application is a continuation-in-part of application Ser. No. 09/321,741, filed May 28, 1999, and which application Ser. No. 09/321,741 is a continuation-in-part of application Ser. No. 08/862,380, filed May 23, 1997, and which application Ser. No. 08/862,380 claims the priority of application Ser. No. 60/018,227, filed May 24, 1996; and this application is a continuation-in-part of application Ser. No. 08/905,142, filed Aug. 1, 1997 which application Ser. No. 08/905,142 is a continuation-in-part of application Ser. No. 08/862,378, filed May 23, 1997, now U.S. Pat. No. 5,909,006, and which application Ser. No. 08/905,142 is a continuation-in-part of application Ser. No. 08/862,379, filed May 23, 1997, and which application Ser. No. 08/905, 142 claims the priority of Provisional Application Ser. No. 60/023,060, filed Aug. 2, 1996, and which application Ser. No. 08/905,142 is a continuation-in-part of application Ser. No. 08/490,757, filed Jun. 15, 1995, now U.S. Pat. No. 5,677,512, and which application Ser. No. 08/490,757 is a continuation-in-part of application Ser. No. 08/371,695, filed Jan. 12, 1995, now U.S. Pat. No. 5,854,443, and each of which is incorporated herein by reference.

This application likewise relates to Applicant's application Ser. No. 08/905,141, filed Aug. 1, 1997; application Ser. No. 08/905,077, filed Aug. 1, 1997; application Ser. No. 08/904,691, filed Aug. 1, 1997; and application Ser. No. 08/904,869, filed Aug. 1, 1997.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes and mounting assemblies.

A further object of the invention includes making electrical boxes or mounting assemblies which use the standard punched-out, stamped electrical boxes in a more intelligent fashion.

Yet another object of the invention is to provide a standard industry size electrical box with a supplemental support for supporting a fixture, and that is located the proper distance from a second supplemental support, and meets National Electrical Code (NEC) standards.

Another object of the invention is to fully exploit the strength of fixture support studs, the top wall, and the side walls of electrical boxes.

Another object of the invention is to achieve a strengthened electrical box with a supplemental support within a standard so-called "4×4" box, while maintaining the near universal 3.5 inch (8.9 cm) spacing between the fixture supports so that the box is usable with standard light fixtures, ceiling fans, and the like.

It is likewise an object of the invention to provide supplemental metal inserts in and/or on the electrical boxes to enhance the carrying strength of the electrical boxes.

A further object of the invention is to provide studs in the electrical boxes that strengthen the electrical boxes.

Yet another object of the invention is to provide studs in the electrical boxes which cover the threads of standard screws so that no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no screwing of fasteners nor welding during assembly thereof.

Yet another object of the invention is to provide an electrical box having components which are easily fabricated, added to the electrical box, and assembled in the final form by the operation of pressing or riveting, yet which do not loosen when subjected to static and/or dynamic loading.

Another object of the invention is to provide a junction box engineered and configured so that a single fixture support/junction box support combination fastener can carry both an electrical fixture and the junction box, as well as attach the junction box to a support.

A still further object of the invention is to provide a junction box in which the supplemental support for carrying static and dynamic loads automatically extends in the desired direction along the side walls of the junction box during assembly and/or in use thanks to the use of a dimpled hole in the top wall thereof and/or thanks to the auxiliary support being configured for engaging the dimpled hole when the auxiliary support is attached and located in its attached, final form ready for use.

A still further object of the invention is to provide a junction box capable of carrying static and/or dynamic loads that has an auxiliary support and that is assembled with fewer parts and with fewer steps than known devices.

It is a yet further object that all the above be carried out with an electrical box which carries the load of supported static and dynamic fixtures better than known electrical boxes.

Another object of the invention is to provide a junction box in which one or more fixture supports are located outside of the main cavity of the junction box, the main cavity being the cavity in which the wiring of the electrical fixture is connected to the wiring of the building.

A further object of the invention is provide a junction box having an outside perimeter sized for being located in a standard junction box opening in a wall, for example, and in which perimeter recesses are defined and sized for locating one or more electrical fixture supports, so that the electrical fixture support(s) are located outside of the main cavity of the junction box, yet within the outside perimeter of the junction box.

Another object of the invention is to provide a junction box in which the weight of the electrical fixture is carried by the top wall of the junction box.

Yet another object of the invention is to provide a junction box in which the weight of an electrical fixture is carried by the top wall of the junction box and by a strengthening element disposed on the top wall of the junction box.

Yet another object of the invention is to provide a junction box in which a fixture support is provided for carrying the weight of an electrical fixture, yet with the fixture support being disposed outside the main cavity of the junction box.

A further object of the invention is to provide a junction box having a fixture support which is disposed outside of the main cavity of the junction box and which cooperates with the top wall of the junction box and which carries the weight of an electrical fixture supported thereby, yet without providing openings in the top wall through which the fixture support extends.

In summary, the present invention is directed to a mounting assembly which includes a junction box having a top wall and a side wall. The side wall extends downwardly away from the top wall and defines a cavity therein. A supplemental fixture support is disposed in the cavity. A dimpled hole is provided in the top wall, and the supplemental fixture support extends into the dimpled hole for engaging at least a portion of the walls thereof. A threaded hole may be provided on the supplemental fixture support. The supplemental fixture support may be a rivet. A rough surface or fluting may be provided on a portion of said support for engaging the walls of the dimpled hole. Preferably, the supplemental fixture support has exposed portions which are sufficiently smooth for preventing wear to plastic-coated electrical wire which engages such exposed surfaces of the fixture support.

The present invention is likewise directed to a mounting assembly having a junction box having a top wall and a downwardly extending side wall defining a cavity therein. An auxiliary cavity is provided outside the cavity, and a fixture support is configured for securing a fixture fastener at least partially within the auxiliary cavity. The fixture support may likewise be disposed at least partially within the auxiliary cavity.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting. The term "main cavity" refers to the cavity within the junction box and in which the electrical fixture wiring is connected to the wiring of the building. The main cavity need not be the largest nor the central cavity.

BRIEF DESCRIPTION OF THE DRAWINGS

FIG. 2 is a cross-sectional view of a preferred embodiment of an electrical junction box according to the invention having dimpled punchouts in a top wall thereof, with the addition of a supplemental support, and with a supplemental support not yet installed;

FIG. 3 is a top plan view of FIG. 2;

FIG. 8 is a perspective view of a further preferred embodiment of a junction box according to the invention;

FIG. 9 is an enlarged view of the threaded dimple of FIG. 8; and

FIG. 10 is a perspective view, similar to FIG. 8 of yet another preferred embodiment of a junction box according to the invention;

FIG. 16 is a partial sectional view of a junction box according to another preferred embodiment of the invention;

FIG. 17 is a top perspective view of the junction box of FIG. 16;

FIG. 18 is a bottom perspective view of the junction box of FIG. 16;

FIG. 19 is a partial sectional view of a further preferred of embodiment of the invention;

FIG. 20 is a side view of the junction box of FIG. 19;

FIG. 21 is a partial sectional view of a junction box according to another preferred embodiment of the invention;

FIG. 22 is a top perspective view of the junction box of FIG. 21;

FIG. 23 is a bottom perspective view of the junction box of FIG. 21;

FIG. 24 is a partial sectional view of a further preferred of embodiment of the invention;

FIG. 25 is a side view of the junction box of FIG. 24;

FIG. 30 is a partial sectional view of a junction box according to another preferred embodiment of the invention;

FIG. 31 is a top perspective view of the junction box of FIG. 30;

FIG. 32 is a bottom perspective view of the junction box of FIG. 30;

FIG. 33 is a partial sectional view of a further preferred of embodiment of the invention;

FIG. 34 is a side view of the junction box of FIG. 33;

FIG. 35 is a partial sectional view of a junction box according to another preferred embodiment of the invention;

FIG. 36 is a top perspective view of the junction box of FIG. 35;

FIG. 37 is a bottom perspective view of the junction box of FIG. 35;

FIG. 38 is a partial sectional view of a further preferred of embodiment of the invention;

FIG. 39 is a side view of the junction box of FIG. 38;

FIG. 43 is a side view of a portion of the junction box of FIG. 45;

FIG. 44 is a side view of the portion of the junction box of FIG. 43;

FIG. 45 is a partial sectional view of a junction box according to another preferred embodiment of the invention;

FIG. 46 is a partial sectional view of a junction box according to another preferred embodiment of the invention;

FIG. 47 is a partial sectional view of a junction box according to another preferred embodiment of the invention;

FIG. 48 is a partial sectional view of a junction box according to another preferred embodiment of the invention;

FIG. 49 is a side view of the junction box of FIG. 48;

FIG. 55 is a side view of a portion of the junction box of FIG. 56;

FIG. 56 is a partial sectional view of a junction box according to another preferred embodiment of the invention;

FIG. 57 is a partial sectional view of a junction box according to another preferred embodiment of the invention;

FIG. 58 is a partial sectional view of a junction box according to another preferred embodiment of the invention;

FIG. 59 is a partial sectional view of a junction box according to another preferred embodiment of the invention;

FIG. 60 is a side view of the junction box of FIG. 59;

DESCRIPTION OF THE PRIOR ART

Figure 1:
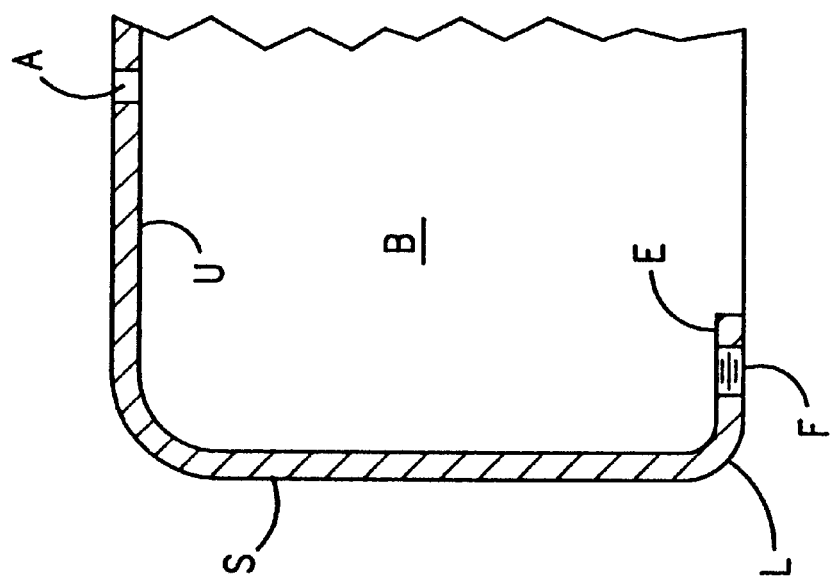
FIG. 1 is a cross sectional view of a PRIOR ART electrical junction box having an inwardly extending ear E with a faceplace plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes B is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 $cm^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static or dynamic load, such as a light fixture or fan weighing 35 lbs. or less.

Such electrical boxes B are unsuited for supporting large static loads, as well as for supporting large dynamic loads, such as ceiling fans which may weigh fifty-five pounds (55 lbs.)/twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Turning to FIGS. 2 and 3, a first preferred embodiment of an electrical box and/or junction box 10 according to the invention will now be described in detail.

Junction box 10 includes a top wall 14, and a side wall 18 extending downwardly therefrom and defining a cavity C therein. Side wall 18 includes a lower free edge 20, and top wall 14 includes a lower face 22 and an upper face 26.

Preferably, one or more punchouts 24 are provided on top wall 14, for example.

Additional holes 36 for receiving portions of an electrical fixture, for example, and/or for fasteners which secure junction box 10 to a ceiling, for example, may likewise be provided.

FIG. 2 illustrates a supplemental support 40 which may be provided for increasing the holding strength of junction box 10. Support 40 on the left of FIG. 2 is installed, and the other support 40 is shown as it will typically be installed by downward insertion through top wall 14.

Supplemental support 40 may be made with a height substantially equal to the distance between lower free edge 20 and lower face 22 of top wall 14.

When increased resistance to inadvertent turning of supplemental support 40 (e.g., support or stud or fastener) about the longitudinal axis of fastener 32 is desired, supplemental support 40 may be provided with an outer surface or face 44 configured for engaging with a portion of dimpled hole 24 for restricting rotation of supplemental support 40. As shown in FIG. 2, configured face 44 may be made as a rough or knurled surface.

The non-configured exterior face of support 40 may be made as a rounded surface 48, as shown. Good results have been achieved with individual flutes 46 which define fluting or fluted portion or roughened surface 44. Good results have been achieved when flutes 46 extend outwardly of rounded/relatively smooth surface 48.

In one embodiment, fifteen (15) to twenty (20) flutes were used on stud 40 having a nominal diameter of 0.25 inches (6.35 mm). There may be as few as one (1) to fourteen (14) flutes 46, depending on the flute length and the intended use of the standard 4" box.

Good results have been achieved when a threaded hole 52 is provided extending at least partially through supplemental support 40. Preferably, threaded hole 52 has threads selected to mate with those of fasteners of electrical fixtures such as lights and ceiling fans. Typically, the threads of threaded hole 52 are provided at least at a lower portion 60 of support 40.

Supplemental support 40 may be attached to box 10 by use of a powered tool driving (e.g., pressing or riveting) support 40 into hole 24.

The threads of threaded hole 52 may extend substantially the entire length through support 40, so that fasteners of various lengths for attaching a light fixture or ceiling fan, for example, may be attached to supplemental support 40 and, hence, to electrical box 10, from below during use.

It is likewise contemplated that threads 52 will only be provided at the top portion of support 40, at the bottom portion of support 40, or at both top and bottom portions with an unthreaded region in between.

Figure 4:
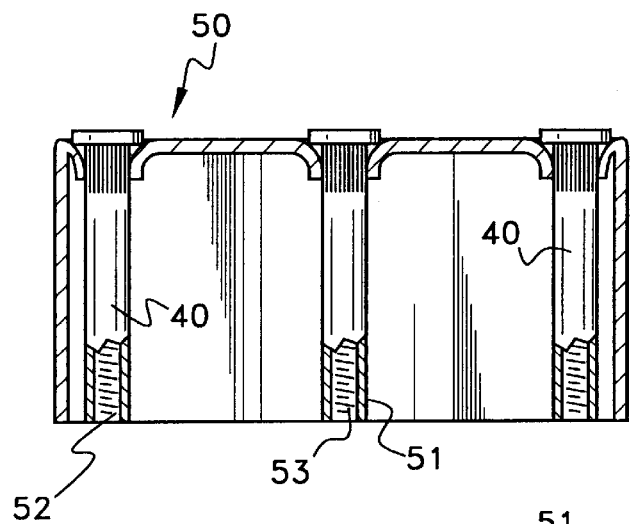
FIG. 4 is a cross-sectional view, similar to FIG. 2, of a still further preferred embodiment of a junction box according to the invention that has four (4) supplemental supports.
Figure 5:
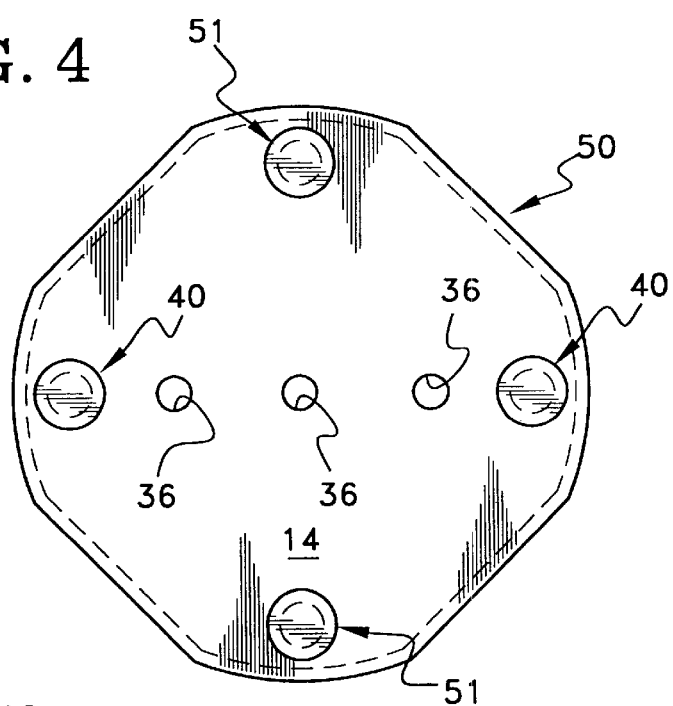
FIG. 5 is a top plan view of the box of FIG. 4.

Still further, as shown in junction box 50 of FIGS. 4 and 5, it is expected that multiple supports having different threads 52 for mating with various fasteners will be provided. For example, four (4) supports may be provided, two (2) of which are supports 40 placed on opposite sides of box 10, and the other two (2) of which are supports 51 placed on different opposed sides of box 10. Then, the one (1) pair of supports 40 is provided with threads 52, sized for mating with light fixture fasteners, and the other pair of supports 41 being provided with threads 53 of a different size than the threads of the first pair for mating with the fasteners which attach a typical ceiling fan to the lower portion of support 40 when in use.

Supports 40 and/or 51 may have a variety of external configurations as well, such as being a full, cylindrical shape with no roughened surface 44, a hexagonal supplemental support 40, a triangular supplemental support 40, and other configurations which achieve the objects of the invention.

Good results have been achieved when dimpled hole 24 has a wall 58 which extends outwardly away from top wall 14 of box 10. For example, wall 58 may extend upwardly, away from the outer surface or upper face 26 of top wall 14.

Alternatively, as shown, wall 58 may extend downwardly into cavity C. the height (i.e., downwardly extending length of wall 58) extends sufficiently into cavity C for securing support 40 sufficiently, depending on the intended use. In that manner, support 40 may be secured by top wall 14 and side wall 58, so that side wall 58 also assists in prevention of movement of support 40 that might lead to a loosening of the connection between support 40 and top wall 14, and, hence, undesirable loosening of the support 40 relative to box 10. That connection preferably should at least be sufficiently secure so that support 40 does not loosen during shipment and installation of box 10.

When two supports 40 are attached to the left and right ones of holes 28, placement of support 40 substantially adjacent side wall 18 yields the added benefit of achieving a standard center-to-center spacing between the respective threads of the threaded holes 52 of each of the two supported supports 40, even when using "standard" box forming equipment for making a standard box size, as discussed in greater detail below. Such also has the benefit of allowing use of standard equipment for forming holes in a sheetrock ceiling for receiving box 10, while maintaining the standard 3.5 inch fixture fastener offset.

It will be appreciated that there are advantages in restricting the tendency of support 40 to move within a vertical plane. Such restriction helps maintain the integrity of the initial connection between support 40 and junction box 10; e.g., the connection between both top wall 14 and support 40, and between both side wall 58 and support 40.

Still further, restricting such tendency of support 40 to rotate within a vertical plane helps to ensure that support 40 (and threads 52) extend substantially parallel to side wall 18 of junction box 10 before and during use. Needless to say, all those aspects of fine-tuning of the connection between support 40 and the remainder of junction box 10 are geared for achieving predictability of where lower portion 60 of support 40 is.

Head 64 of support 40 likewise assists in locating support 40 relative to box 10 and in restricting movement relative thereto. Head 64 may be provided with a diameter of 0.375 inches (9.525 mm) when a body 48 has a diameter of 0.25 inches (6.35 mm).

Needless to say, the disclosed connections and configurations act to restrict all movements between support 40 and the remainder of box 10. The above discussion regarding restriction of movement. within a "vertical" plane is merely an example.

By restricting movement of support 40, there is achieved the desired predictability of where the lower portion of female thread 52 is located so that the desired spacing between a left hand one of supplemental support 40 and a right hand one of supplemental support 40 is achieved. Typically, the spacing between the commonly provided two (2) female threads of threaded holes 52 (i.e., left and right ones) attached to and extending from left and right ones of supports 40 as shown in broken-away portion of FIG. 2 will be achieved. Known light fixtures, for example, are provided with respective left and right male fasteners, three and one half (3½) inches on center, which will be mated with such left and right female threads of the threaded holes 52, during final use of the illustrated junction boxes.

All the advantages described regarding the stabilizing of and the location of threads of the threaded holes 52 and, hence, supplemental support 40, relative to the remainder of junction box 10 hold true for all the other preferred embodiments of the invention.

Figure 6:
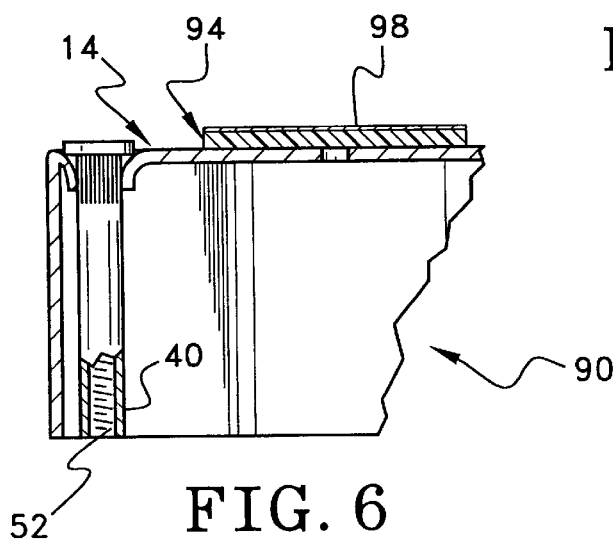
FIG. 6 is a cross-sectional view of another preferred embodiment of a junction box according to the invention.

FIG. 6 shows another preferred embodiment of a junction box 90 according to the invention.

Junction box 90 includes a piece of double-sided tape 94 on top wall 14 thereof. Double-sided tape 94 may be provided with a protective strip or layer 98 on the outer face thereof, i.e., on the face of double-sided tape 94 that has not been adhered to junction box 90. Conventional double-sided tape 94 may be used.

Alternative means for adhering junction box 90 to a surface may be used, such as spray-on adhesive, a piece of putty and other adhering means. Each of those adhering means is as described in my earlier U.S. patent application Ser. No. 08/490,757, filed Jun. 15, 1995, and Ser. No. 08/371,695, filed Jan. 1, 1995, each of which is incorporated herein by reference, and may be utilized in conjunction with or instead of the double-sided tape 94.

One of the many advantages of junction box 90 is that the user may remove protective layer 98, and then adhere double-sided tape 94 to the surface to which junction box 90 is to be attached. Double-sided tape is selected and sized so that sufficient holding power for temporarily adhering or affixing junction box 94 to the surface is achieved, while the user has both hands free for permanently attaching junction box 90 in the desired location by hammering nails (or shooting screws) through one or more holes 36.

Preferably, the adhesive is sufficiently strong to adhere box 90 to a horizontal surface located above the user's head, and for a sufficiently long period of time so that the user may release box 90 after adhering box 90 to a ceiling or wall, locate a fastener (e.g., nail or screw) and still have enough adhering time left to use both of his or her hands to install the fastener by hammering, screwing, or the like.

The thickness of double-sided tape 94 is coordinated with the thickness (i.e., height) of a head 64 of support 40, so head 64 of support 40 does not interfere with adherence of tape 94 to a support. Alternatively, the thickness of tape 94 is coordinated with the height of an unillustrated outwardly extending side wall 58 of dimpled hole 24 so that each performs its intended function, when junction box 90 is provided with an unillustrated outwardly extending side wall 58, for example.

In addition, it is contemplated that the thickness of tape 94 will be varied depending on the characteristics of the surface of the material to which junction box 90 is to be adhered.

Figure 7:
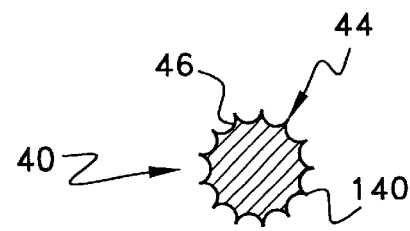
FIG. 7 is a cross-sectional view taken along line 7—7 of the support of FIG. 1.

FIG. 7 illustrates an exaggerated cross-sectional view of the extensions 150 of knurled portion 44 of support 40.

Opening or punchout 24 for receiving supports 40 and/or 51 may be constructed as described above.

During assembly of junction box 10 and/or 50, support 40 and/or 51 may be inserted through and dimpled holes 24.

The following applies to use of supports 40 and 51.

After support 40 is inserted through holes 24 then support 40 is gripped and/or compressed in a standard fashion so as to join top wall 14 and support 40.

During insertion of support 40, extensions 140 engage and cut into the sides of one or both of apertures 24 for restricting movement of support 40 after final assembly thereof. In use, junction box 40 is attached to the desired surface by inserting fasteners through holes 36. Then, the ceiling fan or light fixture is attached by use of fasteners, which will typically be provided with the ceiling fan to be attached. Such fixture fasteners are by screwing such fasteners into threaded hole 52 in the usual manner.

It is likewise contemplated that at least one washer or reinforcement plate may be provided adjacent top wall 14 and aligned with hole 24. Such a washer would include an aperture through which support 40 would extend when assembled.

FIGS. 8 and 9 illustrate a further preferred embodiment of a junction box 100 according to the invention.

Box 100 includes a dimple 108 extending downwardly from top wall 14. Dimple 108 may include internal threads 112 thereon. It is also contemplated that dimple 108 be free of threads, such as dimpled hole 24 of FIG. 2.

A fixture support 120 includes a fixture fastener 122 having a shank portion 124 substantially free of threads, and which extends through an unthreaded hole 126. Threads 128 may be provided on fixture fastener 122 for mating with threads 112 of dimple 108. FIG. 9 is an enlarged view of dimple 108.

Hole 126 may be made with threads. Typically, hole 126 will be unthreaded so that fastener shank 124 passes readily therethrough and because it is not necessary that there be threads on the portion of shank 124 adjacent a head 130 of fastener 122.

Double-sided tape 94, as described above, may be provided for temporarily adhering box 100 to a support surface, as discussed in detail regarding FIG. 6 above. Protective layer 98 is shown partially peeled away just prior to use.

It will be seen that the embodiment of FIGS. 8 and 9 have realized the object of the invention to provide a junction box having a fixture fastener which supports box 100, a fixture attached thereto, and secures both box 100 and attached fixture to a support, such as a ceiling joist.

FIG. 10 illustrates a further preferred embodiment of a junction box 150 according to the invention.

Junction box 150 includes a fixture support 120 as described above regarding FIG. 8.

A threaded hole 158 may be provided in top wall 14. The difference between box 150 of FIG. 10 and box 100 of FIG. 8 is that box 150 has no dimple.

It is likewise contemplated that hole 158 be made free of threads depending on the intended use.

The embodiment of FIG. 10 achieves that same objects as the embodiment of FIG. 8, in an even more simplified version thereof; i.e., no dimple 108 is required.

Figure 11:
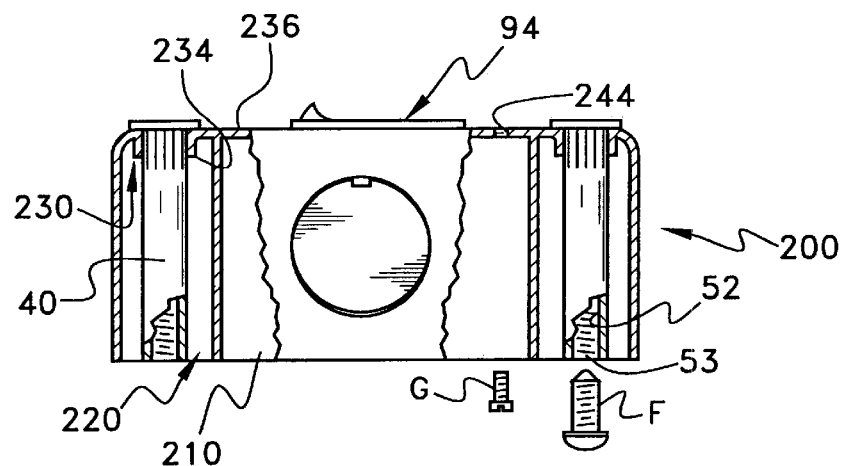
FIG. 11 is a partial sectional view of a junction box according to another preferred embodiment of the invention.
Figures 12, 13:
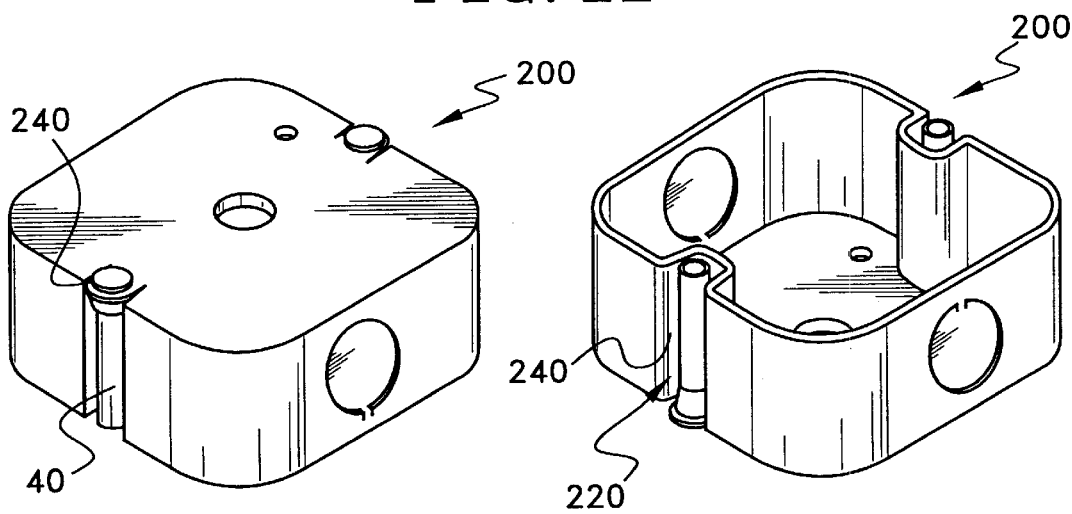
FIG. 12 is a top perspective view of the junction box of FIG. 11.
FIG. 13 is a bottom perspective view of the junction box of FIG. 11.

FIGS. 11–13 illustrate a further preferred embodiment of a junction box 200 according to the invention.

Box 200 includes a main cavity or cavity 210 and an auxiliary or open wall cavity or indentation 220 disposed adjacent thereto.

Auxiliary cavity 220 may be disposed outside of cavity 210. Indentation 220 may be defined by a side wall 224 that may extend inwardly into main cavity 210.

Auxiliary cavity 220 and cavity 210 may be substantially free of or completely free of holes or openings therebetween; e.g., free of hole(s) in wall 224 that would open into cavity 210.

Cavity 210 and auxiliary cavity 220, in this embodiment and in the other embodiments having cavities and auxiliary cavities, may be made in the manner disclosed in application Ser. No. 09/321,741, filed May 28, 1999. See FIGS. 15–21, 29–37, and 44, for example, as well as the related text therein, all of which is incorporated herein by reference.

Support 40 having threaded opening 52 which threads 53 therein may be disposed at least partially within auxiliary cavity 220.

In order to secure support 40 to the remainder of junction box 200, a dimpled hole or other opening 230 defined by downwardly extending wall 234 may be provided, such as on top wall 236.

Dimpled opening 230 may be formed in the manner described in connection with the embodiments of FIGS. 2–10, or as illustrated.

It has been found that walls 234 may be formed as substantially straight walls extending transversely to, or even perpendicular to, top wall 236, for example.

Double-sided tape 94 may be provided on top wall 236 or on one side wall of junction box 200, and used in the manner described above.

A hole 244 sized for receiving a ground screw G may be provided, for convenience.

As in above embodiments, a fixture fastener F may be provided that is sized for engaging with the female threads 53 of support 40.

Dimpled hole 230 may be provided on an extension 240 extending away from the side wall of box 200, or away from top wall 236, as shown.

It will be appreciated that extension 240 may be formed during the stamping process when making box 200 out of stamp sheet metal.

It is likewise contemplated that box 200 be made of a molded plastic for non-metallic and/or synthetic material.

Figures 14, 15:
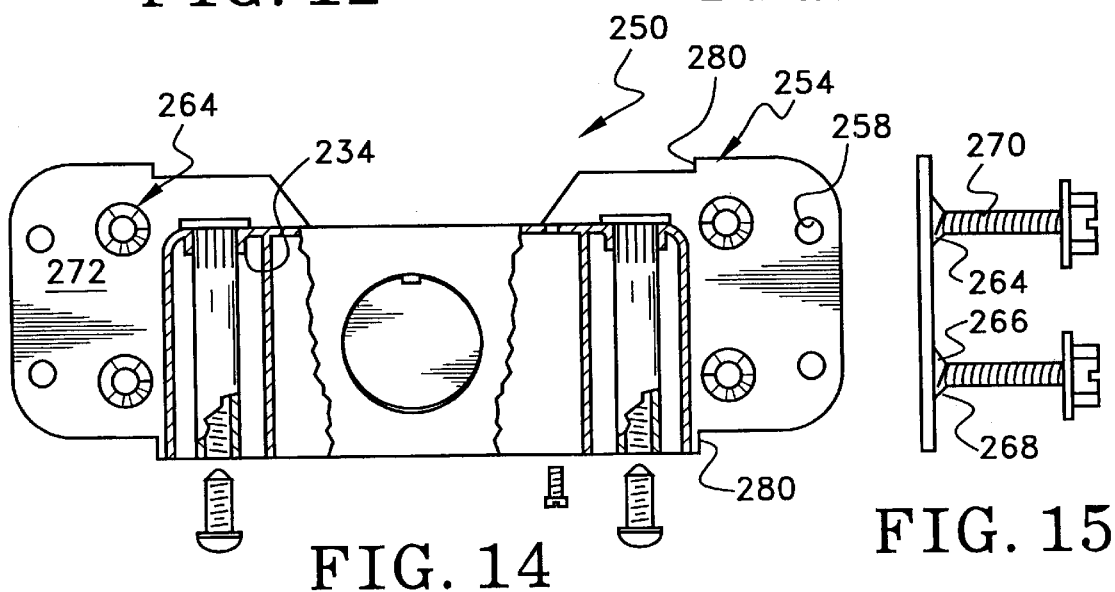
FIG. 14 is a partial sectional view of a further preferred of embodiment of the invention.
FIG. 15 is a side view of the junction box of FIG. 14.

FIGS. 14 and 15 illustrate another preferred embodiment of a junction box 250 according to the invention.

Junction box 250 may include a mounting plate or side support 254 having one or more holes 258 for receiving fasteners, such as nails or screw therethrough.

Additional holes or the illustrated split attachment supports 264 may be provided that act as self-securing (e.g. female) fasteners for receiving and temporarily securing a male fastener therein. Please see FIGS. 15–28 of application Ser. No. 09/321,741, filed May 28, 1999, and the related text therein, for example, all of which is incorporated herein by reference.

Portions 266 and 268 may extend outwardly of the surface of a mounting plate 272 of side support 254 for assisting in the securing of fastener 270 to self-securing fastener 264.

Mounting plate 272 may likewise be provided with one or more depth gages or indicators 280 which serve as references to guide the installer in locating the box 250 relative to a ceiling joist, for example. In that manner, the installer has a ready reference gage 280 so that, after the ceiling material, such as sheet rock or gypsum board is flush with the bottom free edge of box 250 after installation. Different gages 280 may be provided for accommodating different thicknesses of sheet rock, as illustrated in FIGS. 18–28 and described in the related text of application Ser. No. 09/321, 741, filed May 28, 1999, all of which is incorporated herein by reference.

FIGS. 16–18 show another preferred embodiment of a junction box 290 according to the invention.

Junction box 290 may be termed a "2-in-1" junction box, in that box 290 may be used for securing electrical fixtures, for example, of two different types, and each of which is secured to junction box 290 with a different size fastener.

Specifically, junction box 290 includes auxiliary cavity 220, as in the FIG. 11 embodiment, as well as one or more further indentations or cavities 294.

One or more extensions 240 may be provided adjacent cavity 294.

In the case where the illustrated two extensions 240 are provided, a first hole 296 may be provided in one extension 240 and a second hole 298 may be provided in a spaced apart extension 240. As illustrated, first hole 296 may be threaded and sized for securing a fastener H thereto. Second hole 298 may be free of threads, and be sufficiently large so that fastener H may pass therethrough and be secured in hole 296.

It will be appreciated that extension 240 having hole 298 therein assists in reducing movement of fastener H when in use. Thus, fastener H is more securely attached to box 290 when in use.

Typically, fastener H will differ in size from fastener F. For example, fastener H will be an 8/32 screw and fastener F will be a 10/32 screw, so that box 290 may function as a light duty or a heavy duty junction box depending on which pair of the two different size pairs of supports is used.

Box 290 may be secured to a support surface by use of a fastener I sized for extending through, for example, a hole disposed in the top wall of junction box 290.

FIGS. 19 and 20 show another embodiment of a junction box 300 according to the invention.

Box 300 is similar to box 290 of FIG. 16 and may include mounting plate 254 described above having self securing fastener elements 264 therein that receive and secure fasteners 270.

FIGS. 21–23 illustrate another preferred embodiment of a junction box 310 according to the invention.

Box 310 includes an auxiliary cavity or indentation 314 in which support 40 may be disposed. Box 310 may include a strengthening element or illustrated top plate 318. Top plate 318 may include one or more openings or holes 322 therein that are sized for receiving supports 40. One or more holes 324 may be provided and sized for receiving a fastener J thereto.

The top wall 312 of the junction box 310, for example, may be provided with one or more holes 328 for receiving support 40 therethrough and one or more holes 330 for receiving fasteners J therethrough.

Strengthening element 318 eliminates the need for dimpling and may be sized and configured for carrying substantially the entire load of forces exerted by a fixture carried by fasteners F and, hence, by supports 40. Head 64 of fastener 40, for example, transfers downwardly directed forces directed on support 40 by the supported fixture to the strengthening element 318, in use. Then forces exerted by the supported fixture and carried by strengthening element 318 are transferred to the support thanks to fastener J having a fastener head JH thereon. For example, head JH exerts forces on top wall 312 of box 310. Those forces are then exerted onto strengthening element 318 and thus carried thereby. It will likewise be appreciated that threads JT of fastener J transfer forces to the walls defining openings or hole 324 of top plate 318.

FIGS. 24 and 25 illustrate another preferred embodiment of a junction box 340 according to the invention.

Box 340 is similar to box 310 of FIG. 21, with the addition of mounting plate or side support 354 described above.

Figure 26:
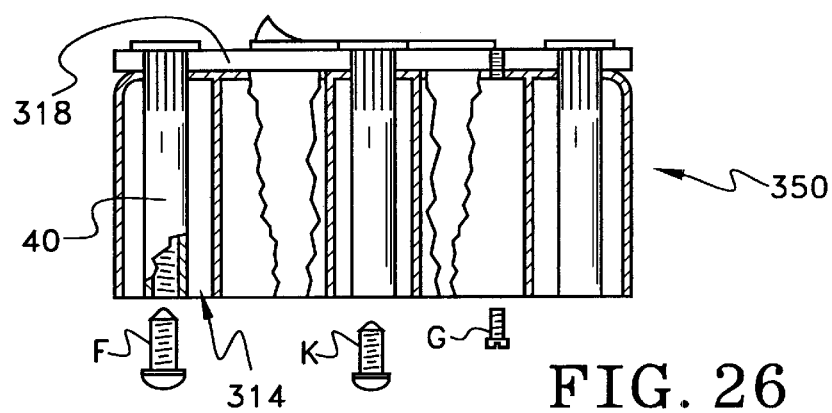
FIG. 26 is a partial sectional view of a junction box according to another preferred embodiment of the invention.
Figure 27:
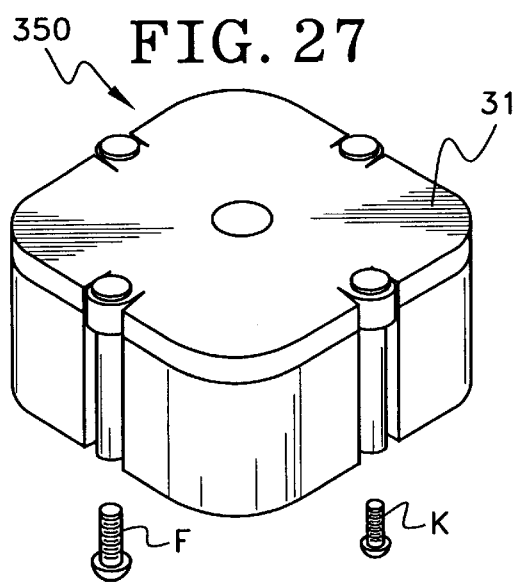
FIG. 27 is a top perspective view of the junction box of FIG. 26.
Figure 28:
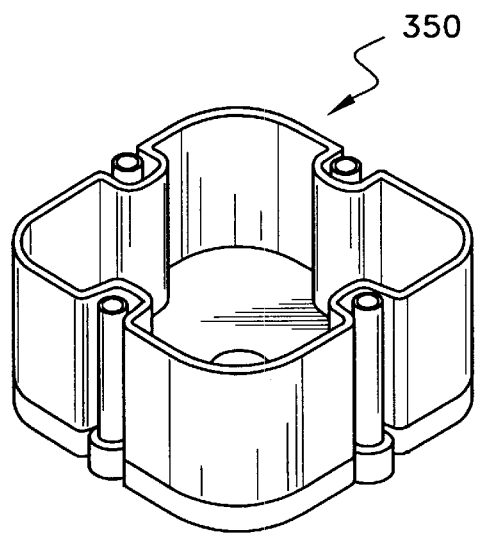
FIG. 28 is a bottom perspective view of the junction box of FIG. 26.

FIGS. 26–28 illustrate another preferred embodiment of a junction box 350 according to the invention.

Junction box 350 is similar to junction box 310 of FIG. 21, for example, with the two-in-one capability of alternately supporting a fixture requiring a first type of fixture and a different fixture requiring a second type of fixture, as in the FIG. 16 junction box 290.

Box 350 includes, for example, four (4) auxiliary cavities 314 having a pair of supports 40 disposed therein and having female threads sized for receiving a fixture fastener F of a first type such as a 10/32 fastener. The remaining paired supports 40 have threads sized for receiving a further fixture fastener K, such as an 8/32 male fastener for securing a fixture to box 350 in use.

Figure 29:
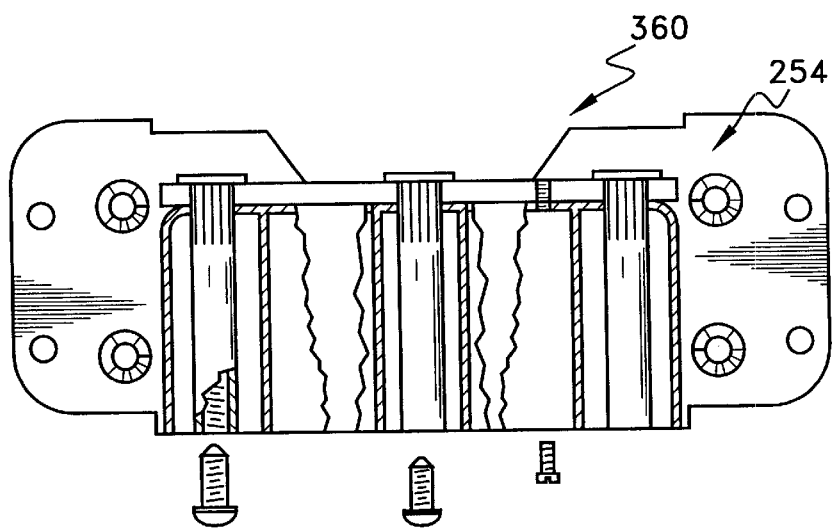
FIG. 29 is a partial sectional view of a further preferred of embodiment of the invention.

FIG. 29 illustrates another preferred embodiment of a junction box 360 similar to box 350 of FIG. 28, and with the addition of side support or mounting plate 254, as described above.

FIGS. 30–32 show another preferred embodiment of a junction box 370 according to the invention.

Box 370 includes auxiliary cavity 314, strengthening element or top wall 318 having hole 324 therethrough and which is sized for receiving fastener J therethrough, as described above regarding similar structural features and other preferred embodiments. Fastener J is likewise provided with head JH sized for engaging the top wall of junction box 370 and transferring the forces exerted on junction box 370, if any, to strengthening elements 318. In that manner, forces exerted on fastener J are carried by strengthening element 318 and not by the remainder of the junction box 370 defining the main cavity 372 and auxiliary cavities 314.

It is contemplated that a thickness 374 of strengthening element or top plate 318 be sized for ensuring that substantially all, if not all, of the forces exerted on the junction box by fixture fasteners H are transferred thereto. Thickness 374 will vary depending on the intended use, such as for light duty or heavy duty use, the material of top plate 318, the material of the remainder of the junction box defining cavities 314 and 372, and like considerations.

A threaded hole 373 may be provided in top plate 318 so that threads HG of fastener H may be attached thereto. It is likewise contemplated that threaded hole 373 be made as an unthreaded hole and threads HT of fastener H be self-tapping threads.

Thus, in use, forces applied by a fixture supported by fasteners H will be transferred through fasteners H to threads of the threaded hole 373 and hence to top plate 318. The forces carried by top plate 318 are transferred to fastener J which thus transfers such forces to the support to which fastener J is secured. As in previous embodiments, the forces exerted by an electrical fixture, for example, are carried substantially only by top plate 318 and not by the remainder of junction box 370.

FIGS. 33 and 34 show another preferred embodiment of a junction box 380 according to the invention.

Junction box 380 is similar to junction box 370 of FIG. 30, with the additional feature of side support or mounting plate 254 disposed thereon, as described above.

FIGS. 35–37 illustrate another preferred embodiment of a junction box 390 according to the invention.

Box 390 is similar to box 370 of FIG. 30, yet is configured so that it may be used as a two-in-one box such as described in connection with box 350 of FIG. 26.

FIGS. 38 and 39 show another preferred embodiment of a junction box 400 according to the invention.

Box 400 is similar to box 390 of FIG. 35, and has the additional feature of side support or mounting plate 254, as described above.

Figure 40:
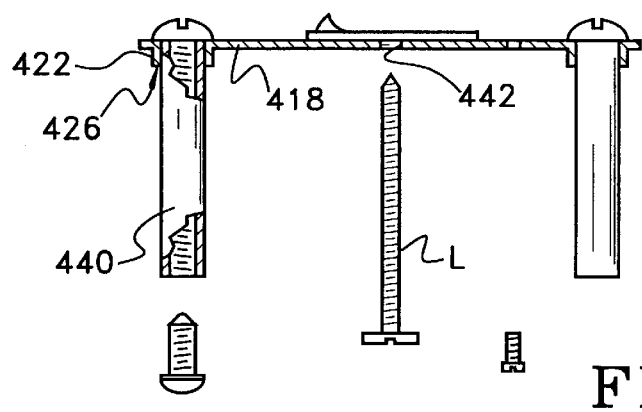
FIG. 40 is a partial sectional view of a portion of a junction box according to another preferred embodiment of the invention, as shown in FIG. 41.
Figure 41:
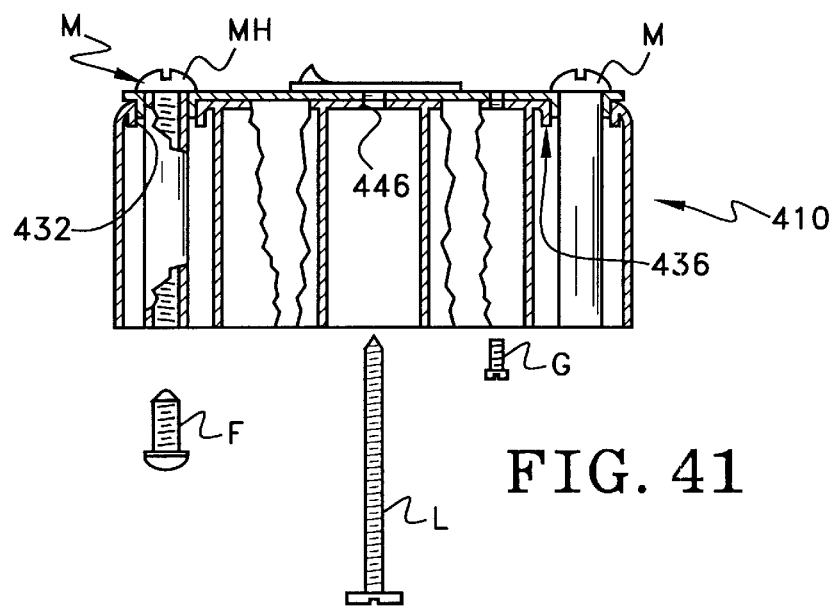
FIG. 41 is a partial sectional view of a junction box according to another preferred embodiment of the invention.

FIGS. 40 and 41 illustrate further preferred embodiment of a junction box 410 according to the invention. Junction box 410 includes a strengthening element or top plate 418 having the feature of downwardly extending side walls 422 defining a dimple 426.

Side walls 422 of top plate 418 are sized for engaging with downwardly extending side walls 432 of a respective dimple 436. In that manner, a double dimple or a double-walled dimple is achieved, as shown. Thus, box 410 is provided with a much greater carrying strength, while utilizing relatively thin-walled strengthening element or top plate 418.

Fastener 440 may be sized so that it is secured or fixedly attached to dimple 426, which dimple 426 in turn is sized for being secured or fixedly attached within dimple 436. Support 440 may be sufficiently wedged into dimple 426 so that movement of support 440 relative to support plate 418 is prevented. Likewise, dimple 426 (i.e., walls 422) is wedged into dimple 436 for further ensuring that movement of support 440 relative to the remainder of box 410 is prevented.

A fastener M having a head MH may be provided for further securing support 440 to the remainder of junction box 410, such as, specifically securing to dimple 426.

It is contemplated that head MH of fastener M be oversized so as to engage a sufficient amount of top plate 418 for preventing withdrawal of support 440 through dimple 426 by downwardly acting forces pulling on support 440. For example, forces exerted by a fixture secured to support 440 by use of fasteners F.

A threaded fastener L may be provided for insertion through threaded or unthreaded respective holes 442 and 446 for securing a fixture thereto. Threaded fastener L may be provided so that box 410 can be utilized as a two-in-one box for use with an electrical box for use with an electrical fixture of the type carried by a pair of fasteners F, or for use with an electrical fixture of the type carried by a pair of fasteners L, as will be readily appreciated. In use, fastener L will be engaged with one or both of threaded or unthreaded holes 442 and 446, depending on the intended use.

Figure 42:
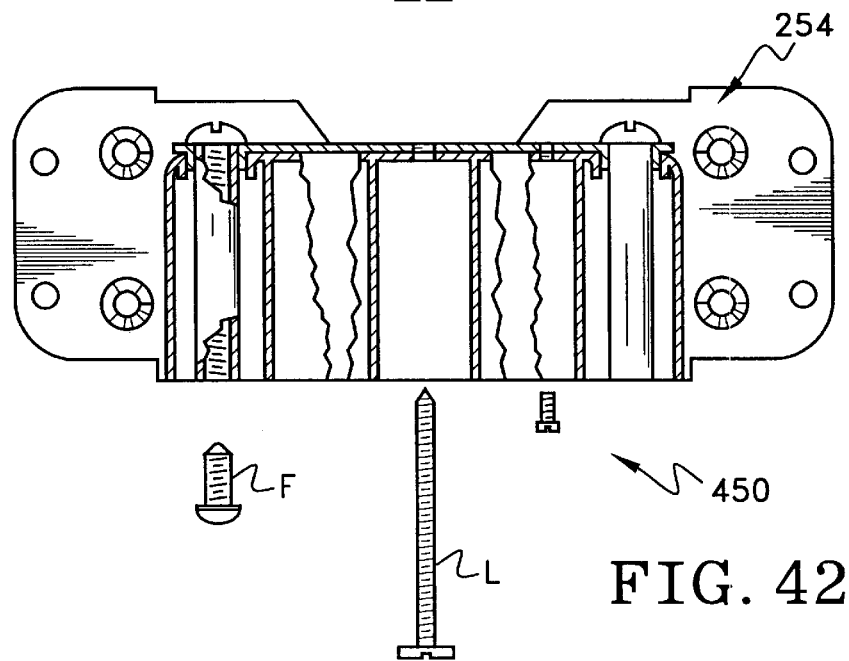
FIG. 42 is a partial sectional view of a further preferred of embodiment of the invention.

FIG. 42 illustrates another preferred embodiment of a junction box 450 according to the invention that has features similar to the junction box 410 of FIG. 40 with the addition of side support or mounting plate 254 described above.

FIGS. 43–45 illustrate another preferred embodiment of a junction box 460 according to the invention.

Junction box 460 of FIGS. 43–45 is similar to junction box 410 of FIGS. 40–41, and uses fluted supports 40 instead of support 440, for example.

In addition, box 460 is configured with a main cavity, as shown, and without the use of auxiliary cavity, as in the FIG. 41 embodiment. This can be accomplished by the use of studs 40 having exterior surfaces sufficiently smooth so as to avoid wear on the plastic coating of plastic-coated wire disposed in the cavity of box 460 during use.

One or more additional studs 464, such as a pair of studs may be provided in addition to the illustrated pair of support studs 40. Supports 464 may include fixture fastener threads 466 that differ from fixture fastener threads 53 of support 40. In that manner, box 460 may be a two-in-one box suited for mounting, alternatively, a fixture requiring a first type of fixture fasteners and a further fixture requiring a second type of fixture fasteners, as described in connection with the other two-in-one boxes elsewhere.

A strengthening element or top plate 468 similar to top plate 418 of FIGS. 40–42, for example, may likewise be provided so that the static and dynamic forces exerted by a fixture on supports 40 and 464 are substantially carried by top plate 468.

FIG. 46 illustrates another preferred embodiment of junction box 470 according to the invention. Box 470 is similar to box 460 of FIG. 45, with the added provision of auxiliary cavities 474, for example.

FIG. 47 illustrates another preferred embodiment of a junction box 480 according to the invention that is similar to junction box 460 of FIG. 45 and with the addition of side support or mounting plate 254, as described above.

FIG. 48 shows another preferred embodiment of a junction box 490 which is similar to junction box 480 of FIG. 47 and to box 470 of FIG. 46, owing to its combination of box 470 with a side support or mounting plate 254 described above.

FIG. 49 is a partial side view of side mount 254 with fasteners 270 secured in self holding screw holders or through holes 264 described above.

Figure 50:
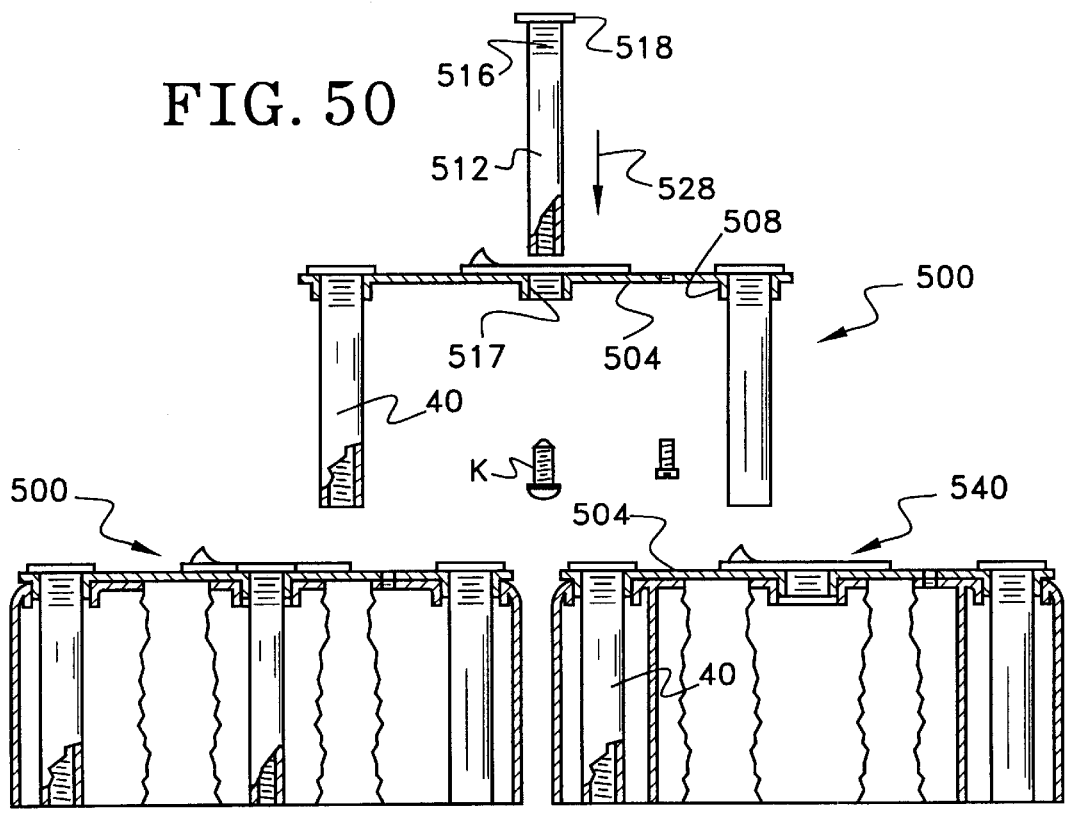
FIG. 50 is a side view of a portion of the junction box of FIG. 51.
Figure 51:
FIG. 51 is a partial sectional view of a junction box according to another preferred embodiment of the invention.

FIGS. 50 and 51 illustrate another preferred embodiment of a junction box 500 according to the invention.

Junction box 500 includes a strengthening element or top plate 504 having one or more dimples 508 therein. Box 500 may be configured so that all fixture supports 40 and the one or more further fixture supports 512 are disposed in a single main cavity. Owing to the sufficiently smooth exposed surfaces of supports 40 and 512, no abrasion to plastic-coated wire disposed in the main cavity occurs during use, as discussed elsewhere.

Supports 512 may be provided with male threads 516 for mating with female threads 517 of dimple 508. It is contemplated that outwardly extending protrusions, such as one or more spaced apart concentric rings, or roughened surfaces be substituted or used in conjunction with male threads 516.

Support 512 may be provided with a head 518 which assists in the transfer of dynamic and static forces exerted on support 512 to top plate 504 instead of to the remainder of junction box 500. Arrow 528 illustrates the direction in which support 512 will typically be inserted and screwed into and wedged into dimple 508.

Figure 52:
FIG. 52 is a partial sectional view of a junction box according to another preferred embodiment of the invention.

FIG. 52 shows another preferred embodiment of a junction box 540 according to the invention that has a top plate 504 as in the embodiment of FIG. 50, and differs from box 500 in that all of the fixture supports, such as the illustrated support 40 are disposed in auxiliary cavities of the type described elsewhere.

Figure 53:
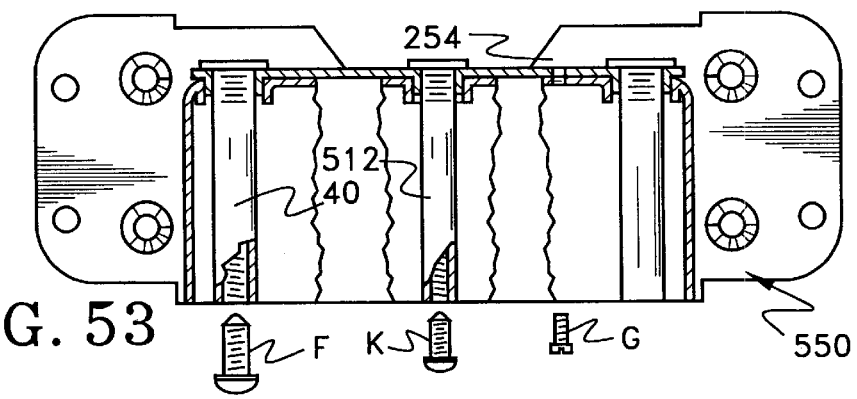
FIG. 53 is a partial sectional view of a junction box according to another preferred embodiment of the invention.

FIG. 53 illustrates another preferred embodiment of box 550 according to the invention which differs from box 500 of FIG. 50 thanks to the provision of side support or mounting plate 254, for example. As described above, box 550 is a two-in-one box thanks to its use of paired support 40 and paired supports 512. Support 40 is sized for securing fastener F (e.g., 10/32 fasteners) and supports 512 are sized for securing fasteners K (e.g., 8/32 fixture fasteners).

Figure 54:
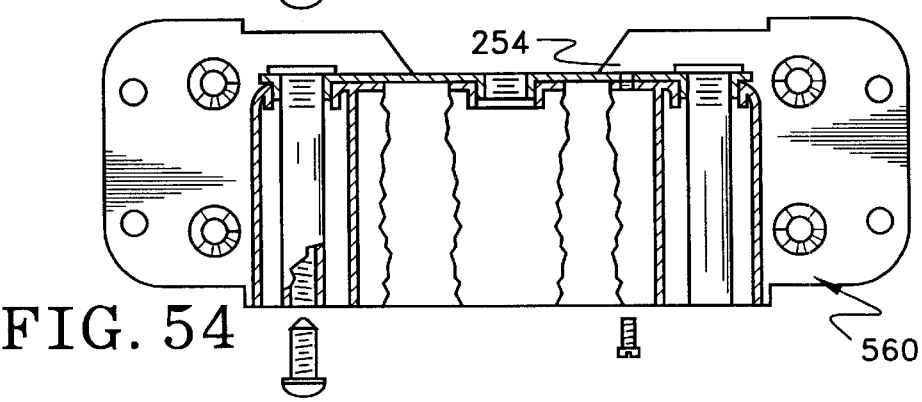
FIG. 54 is a partial sectional view of a junction box according to another preferred embodiment of the invention.

FIG. 54 illustrates a further embodiment of a junction box 560 similar to junction box 540 of FIG. 52 with the provision of side mount or mounting plate 254 described above.

FIGS. 55 and 56 show a junction box 570 according to another preferred embodiment of the invention.

Box 570 is similar to box 460 of FIG. 45, yet is a two-in-one box thanks to its use of two different pairs of supports 40 and 512, all of which are disposed inside the main cavity of box 570.

FIG. 57 shows another preferred embodiment of a junction box 580 according to the invention that has fluted support 40 and 512 as in junction box 570 of FIG. 55, and with the provision of an auxiliary cavity for each of the supports 40 and 512.

FIG. 58 illustrates another preferred embodiment of a junction box 590 according to the invention which is similar to junction box 570 of FIG. 56, along with side mount or mounting plate 254 described above.

FIGS. 59 and 60 show another preferred embodiment of a junction box 600 according to the invention that is similar to junction box 580 of FIG. 57, along with the provision of side mount or mounting plate 254 described above.

Figure 61:
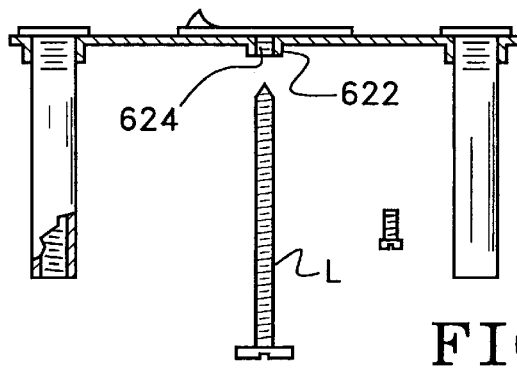
FIG. 61 is a view of a portion of the junction box of FIG. 62 according to another preferred embodiment of the invention.
Figure 62:
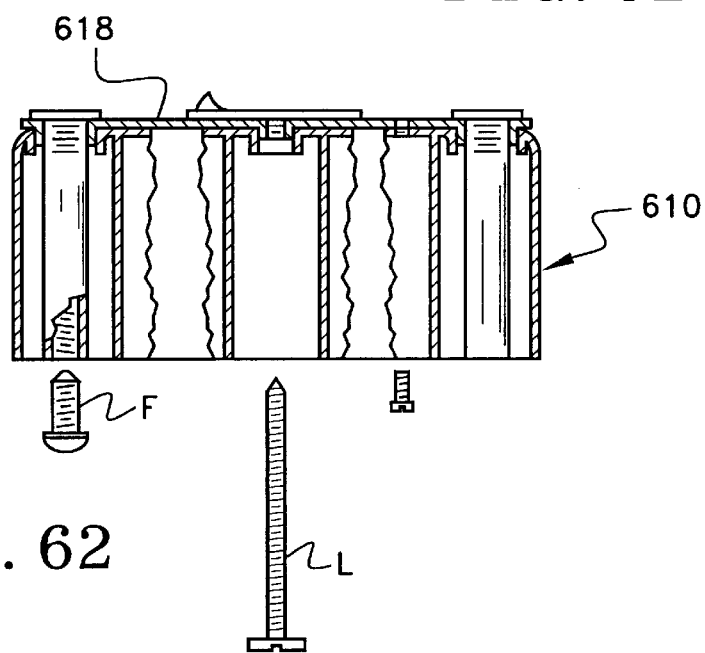
FIG. 62 is a partial sectional view of a further preferred of embodiment of the invention.

FIGS. 61 and 62 illustrate another preferred embodiment of a junction box 610 according to the invention that has a top plate or strengthening element 618 similar to top plate 504 described above, and which includes one or more dimples 622 having optional threads 624 therein that are sized for securing the above-described threaded fasteners L.

Figure 63:
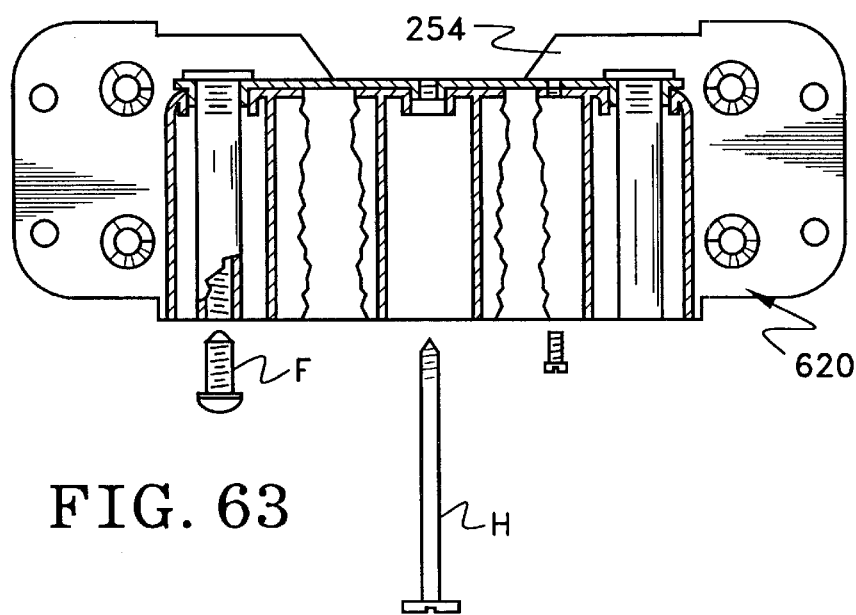
FIG. 63 is a partial sectional view of a further preferred of embodiment of the invention.

FIG. 63 shows a further preferred embodiment of a junction box 520 that is similar to box 610 of FIG. 62. Box 620 additionally has side support or mounting plate 254 and may be sized for securing fasteners L or fasteners H, both of which are described above.

As to supplemental supports, such as the illustrated supports 40 and 51, it is likewise contemplated that such supplemental supports will have fully round cylindrical shapes, hexagonal-shapes, square shapes, shapes which are tapered at an upper portion thereof (i.e., shapes that have the appearance of truncated cones, and truncated pyramids. In addition, frustrums of pyramids and the other shapes are contemplated with truncation taken at various angles (when installed) relative to the inner face 22 of top wall 14.

Good results have been achieved when support 24 is made in a multi-step process using a progression die.

In such case, no material is initially removed from top wall 14 by drilling or punching. Rather, a progression die is pressed into upper surface 26 of top wall 14 and then out through lower surface 22, when forming the preferred embodiment of FIG. 2, for example.

The progression die is inserted so that a first punchout or hole having a first diameter is formed, the progression die is retracted and then reinserted further so as to form a hole having a second diameter larger than the first diameter. Then, the progression die is retracted a second time, and inserted a third time, forming the desired final third diameter greater than the second diameter.

In that manner, the hole 24 can be made with the desired height of wall 58. In the present case, where the final diameter has been described as being, for example, one quarter inch in diameter to mate with the one quarter inch diameter stud or support 40, the progression die would initially form a hole having a diameter of about one-sixteenth inch, and form the second diameter with a diameter of about one-eighth inch, and then form the third and final diameter with the desired one quarter inch nominal diameter.

It will be appreciated that the progression die may be a single progression die, or a series of two or three progression dies. Depending on the intended use, it will be appreciated that material may be removed, such as by drilling and the like, prior to use of a progression die.

It is also contemplated that for intended uses where relatively large static and dynamic forces are expected, fewer knurlings/flutes each extending outwardly of support 40 generally resist such forces better than more knurlings having a shorter length extending past the remainder of stud 40 for similar applications.

In addition to or instead of the supports and/or studs used in the embodiments of FIGS. 1–63, it is expected that locking coupling nuts will be used to attach supplemental supports to the junction box, as well as any other means of fastening supplemental supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
   a) a junction box having a top wall and a downwardly extending side wall defining a cavity therein;
   b) an auxiliary cavity disposed outside the cavity;
   c) a fixture support-disposed adjacent one of the top wall and the side wall and outside the cavity; and
   d) a roughened surface being provided between the support and one of the top wall and the side wall for securing the fixture support to one of the top wall and the side wall.

2. A device as in claim 1, wherein:
   a) the support includes an opening defined in one of the top wall and the side wall; and
   b) the opening being sized for receiving a fixture fastener.

3. A device as in claim 2, wherein:
   a) the support includes an extension provided on one of the top wall and the side wall; and
   b) the opening is disposed on the extension.

4. A device as in claim 3, wherein:
   a) the support includes a further extension provided on a portion of the side wall spaced apart from the extension; and
   b) a further opening is provided on the further extension.

5. A device as in claim 4, wherein:
   a) a lower free edge is defined on the junction box; and
   b) the further extension is provided adjacent the lower free edge of the junction box.

6. A device as in claim 1, wherein:
   a) the support includes an opening defined in one of the top wall and the side wall; and
   b) a stud is disposed in the opening, the stud being configured for securing a fixture fastener thereto.

7. A device as defined in claim 1, wherein:
   a) a further fixture support is disposed adjacent to one of the top wall and the side wall and outside the cavity.

8. A device as defined in claim 7, wherein:
   a) a strengthening element extends between the fixture support and the further fixture support.

9. A device as defined in claim 8, wherein:
   a) at least one of the fixture support and the further fixture support extends through the strengthening element.

10. A device as defined in claim 1, wherein:
    a) a mounting plate is provided on one of the top wall and the side wall of the box.

11. A device as defined in claim 1, wherein:
    a) an adhesive is provided on the top wall of the box; and
    b) the adhesive is sufficiently strong for adhering the box to a support surface.

12. A device as defined in claim 11, wherein:
    a) the adhesive is a piece of double-sided tape.

13. A mounting assembly, comprising:
    a) a junction box having a top wall and a downwardly extending side wall defining a cavity therein;
    b) the junction box defining an outer perimeter;
    c) an indentation defined in the outer perimeter, the indentation being disposed outside of the cavity;
    d) a support disposed adjacent one of the top wall and the side wall and outside the cavity;
    e) the support being engaged with the top wall; and
    f) a strengthening element being disposed on the top wall, the strengthening element being configured for strengthening the top wall for enhancing the strength thereof for supporting the support.

14. A device as in claim 13, wherein:
    a) the support includes an opening defined in one of the top wall and the side wall; and
    b) the opening being sized for receiving a fixture fastener.

15. A device as in claim 14, wherein:
    a) the support includes a further opening defined in one of the top wall and side wall; and
    b) the further opening is sized for receiving a further fixture fastener of a type which differs from the fixture fastener received by the opening.

16. A device as in claim 14, wherein:
    a) the opening is a dimpled opening having an outwardly extending side wall.

17. A device as in claim 13, wherein:
    a) the support is an extension provided on one of the top wall and the side wall.

18. A device as in claim 17, wherein:
    a) the extension extends transversely relative to the side wall.

19. A device as in claim 18, wherein:
    a) a stud engages the extension, the stud being sized for securing a fixture fastener thereto.

20. A device as in claim 13, wherein:
    a) the strengthening element including a plate; and
    b) an opening is defined in the plate, the opening being configured for receiving a fixture fastener therethrough.

21. A device as defined in claim 20, wherein:
    a) a threaded hole is provided on the fixture support.

22. A mounting assembly, comprising:
    a) a junction box having a top wall and a downwardly extending side wall defining a cavity therein;
    b) an auxiliary cavity disposed outside the cavity;
    c) a fixture support extending through the top wall and into the auxiliary cavity, the fixture support being disposed at least partially within the auxiliary cavity during use;
    d) an opening being defined in the top wall;
    e) a further opening being defined in the strengthening element; and
    f) the fixture support extending through the opening and the further opening.

23. A device as defined in claim 22, wherein:
a) the further opening in the strengthening element includes a dimple having an outwardly extending side wall; and
b) the outwardly extending side wall of the dimple is disposed in the opening in the top wall.

24. A device as defined in claim 23, wherein:
a) the opening in the top wall includes an outwardly extending side wall; and
b) the outwardly extending side wall of the dimple in the top wall engages the outwardly extending side wall of the dimple of the strengthening element.

25. A device as defined in claim 23, wherein:
a) the outwardly extending side wall of the dimple of the strengthening element is substantially straight and extends transversely relative to the remainder of the strengthening element.

26. A mounting assembly, comprising:
a) a junction box having a top wall and a downwardly extending side wall defining a cavity therein;
b) a support being disposed adjacent the side wall;
c) a strengthening element disposed on the top wall, the strengthening element being configured for strengthening the top wall supporting the support; and
d) the support being carried by the strengthening element for transferring forces exerted on the support to the strengthening element.

27. A device as defined in claim 26, wherein:
a) an opening is provided in the strengthening element and the support extends through the opening.

28. A device as defined in claim 27, wherein:
a) a further opening is defined in the top wall, and the support extends through the further opening.

29. A device as defined in claim 28, wherein:
a) the opening in the strengthening element includes a dimple having an outwardly extending side wall thereon; and
b) the outwardly extending side wall of the dimple extends through the further opening in the top wall.

30. A device as defined in claim 29, wherein:
a) the further opening in the top wall includes a further dimple having an outwardly extending side wall; and
b) the side wall of the strengthening element dimple engages the side wall of the further dimple in the top wall.

31. A mounting assembly, comprising:
a) a junction box having a top wall and a downwardly extending side wall defining a cavity therein;
b) an auxiliary cavity disposed outside the cavity;
c) a support disposed adjacent one of the top wall and the side wall and outside the cavity;
e) an adhesive being provided on the top wall of the box; and
f) the adhesive being sufficiently strong for adhering the box to a support surface.

32. A device as defined in claim 31, wherein:
a) the adhesive is a piece of double-sided tape.

33. A device as defined in claim 31, wherein:
a) a mounting plate is provided on one of the top wall and the side wall of the box.

34. A device as defined in claim 31, wherein:
a) said support is disposed in said auxiliary cavity.

35. A mounting assembly, comprising:
a) a junction box having a top wall and a downwardly extending side wall defining a cavity therein;
b) an auxiliary cavity disposed outside the cavity;
c) a support disposed adjacent one of the top wall and the side wall and outside the cavity; and
d) a mounting plate being provided on one of the top wall and the side wall of the box.

36. A device as defined in claim 35, wherein:
a) an adhesive is provided on the top wall of the box; and
b) the adhesive is sufficiently strong for adhering the box to a support surface.

37. A device as defined in claim 35, wherein:
a) the adhesive is a piece of double-sided tape.

38. A device as defined in claim 35, wherein:
a) said support is disposed in said auxiliary cavity.

39. A mounting assembly, comprising:
a) a junction box having a top wall and a downwardly extending side wall defining a cavity therein;
b) an auxiliary cavity disposed outside the cavity;
c) a fixture support disposed adjacent one of the top wall and the side wall and outside the cavity;
d) a further fixture support disposed adjacent to one of the top wall and the side wall and outside the cavity; and
e) a strengthening element extending between the fixture support and the further fixture support.

40. A device as defined in claim 39, wherein:
a) at least one of the fixture support and the further fixture support extends through the strengthening element.

41. A device as defined in claim 39, wherein:
a) an adhesive is provided on the top wall of the box; and
b) the adhesive is sufficiently strong for adhering the box to a support surface.

42. A mounting assembly, comprising:
a) a junction box having a top wall and a downwardly extending side wall defining a cavity therein;
b) a support being disposed adjacent the side wall;
c) a strengthening element disposed on the top wall, the strengthening element being configured for strengthening the top wall supporting the support;
d) the support being carried by the strengthening element for transferring forces exerted on the support to the strengthening element;
e) an opening being provided in the strengthening element and the support extending through the opening;
f) the opening in the strengthening element being a dimple having an outwardly extending side wall thereon; and
g) the outwardly extending side wall of the dimple extending through a further opening in the top wall.

43. A device as defined in claim 42, wherein:
a) an adhesive is provided on the top wall of the box; and
b) the adhesive is sufficiently strong for adhering the box to a support surface.

44. A device as defined in claim 42, wherein:
a) a mounting plate is provided on one of the top wall and the side wall of the box.

* * * * *